United States Patent
Grube et al.

(10) Patent No.: US 9,158,625 B2
(45) Date of Patent: Oct. 13, 2015

(54) ACQUIRING A TRUSTED SET OF ENCODED DATA SLICES

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/480,882

(22) Filed: Sep. 9, 2014

(65) Prior Publication Data

US 2014/0380124 A1    Dec. 25, 2014

Related U.S. Application Data

(63) Continuation of application No. 13/647,533, filed on Oct. 9, 2012, now Pat. No. 8,839,368.

(60) Provisional application No. 61/554,152, filed on Nov. 1, 2011.

(51) Int. Cl.

| | |
|---|---|
| *G11C 29/00* | (2006.01) |
| *G06F 11/10* | (2006.01) |
| *H04W 12/00* | (2009.01) |
| *H04L 29/08* | (2006.01) |
| *H04W 12/02* | (2009.01) |
| *G06F 11/00* | (2006.01) |
| *H04L 1/00* | (2006.01) |
| *H04L 29/06* | (2006.01) |

(52) U.S. Cl.
CPC ............ *G06F 11/1076* (2013.01); *G06F 11/00* (2013.01); *H04L 1/0057* (2013.01); *H04L 63/08* (2013.01); *H04L 67/1097* (2013.01); *H04W 12/00* (2013.01); *H04W 12/02* (2013.01); *H04L 2001/0092* (2013.01)

(58) Field of Classification Search
CPC ... G06F 11/1076; G06F 11/00; G04L 1/0057; H04L 63/08
See application file for complete search history.

(56) References Cited

U.S. PATENT DOCUMENTS

| | | | | |
|---|---|---|---|---|
| 5,428,630 | A * | 6/1995 | Weng et al. | 714/763 |
| 5,805,799 | A * | 9/1998 | Fredrickson et al. | 714/52 |
| 6,539,514 | B1 * | 3/2003 | Bartlett | 714/761 |
| 7,373,506 | B2 * | 5/2008 | Asano et al. | 713/168 |
| 7,739,577 | B2 * | 6/2010 | Earhart et al. | 714/763 |
| 7,962,763 | B2 * | 6/2011 | Trezise et al. | 713/193 |
| 8,234,540 | B2 * | 7/2012 | Buchmann et al. | 714/758 |

* cited by examiner

*Primary Examiner* — Esaw Abraham
(74) *Attorney, Agent, or Firm* — Garlick & Markison; Timothy W. Markison

(57) ABSTRACT

A method for execution by a computing device, the method begins in response to a data segment access request, generating a set of access requests regarding a set of encoded data slices. The method continues by sending a subset of the access requests to storage units of a dispersed storage network (DSN) and sending an access request of the set of access requests to a trusted storage unit of the DSN. The method continues by receiving a trusted encoded data slice from the trusted storage unit and receiving a subset of encoded data slices from the storage units, wherein the trusted encoded data slice is utilized to authenticate the subset of encoded data slices and when the subset of encoded data slices are authenticated, the trusted encoded data slice and the subset of encoded data slices are decoded to recover the data segment.

12 Claims, 15 Drawing Sheets

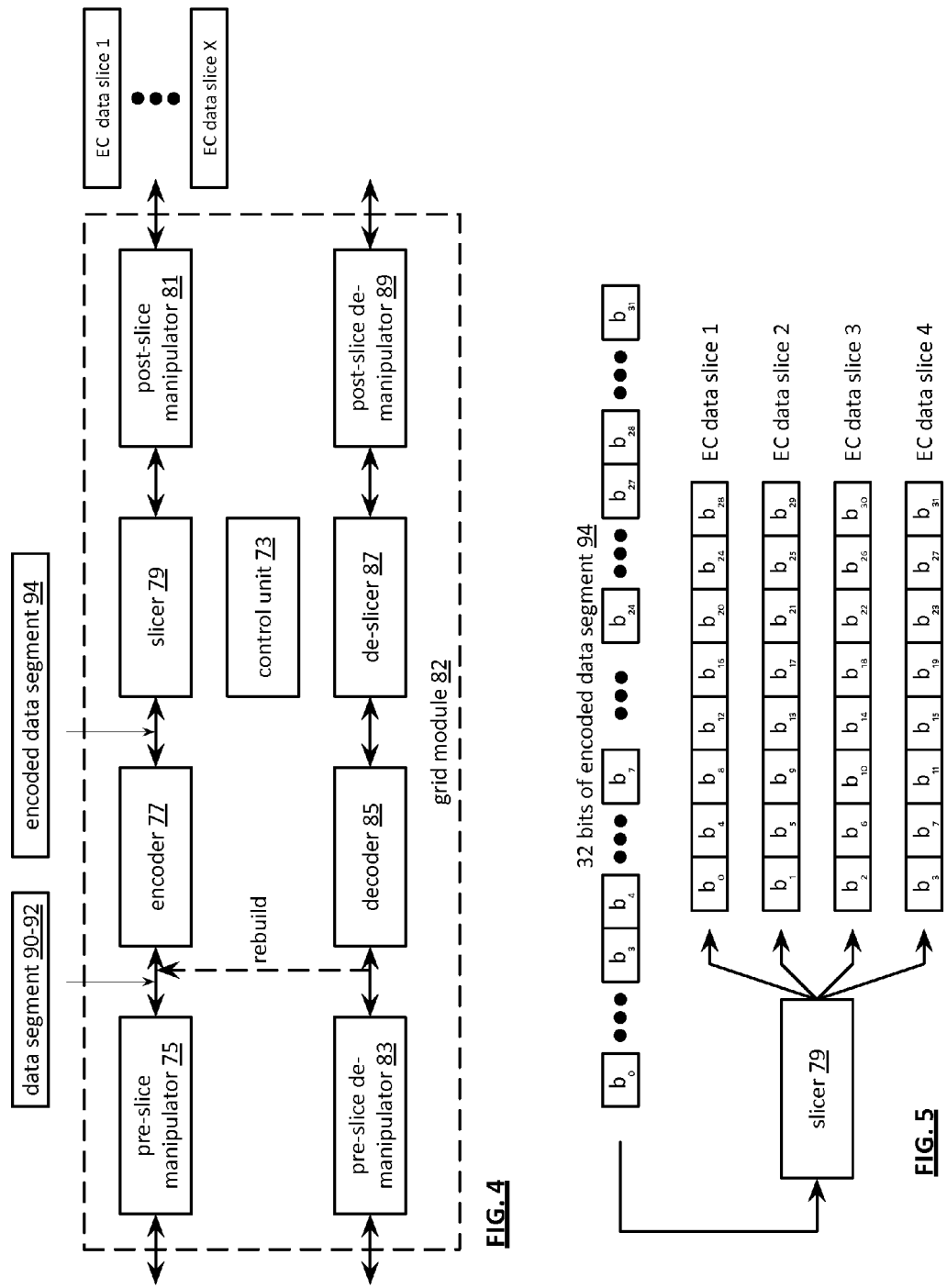

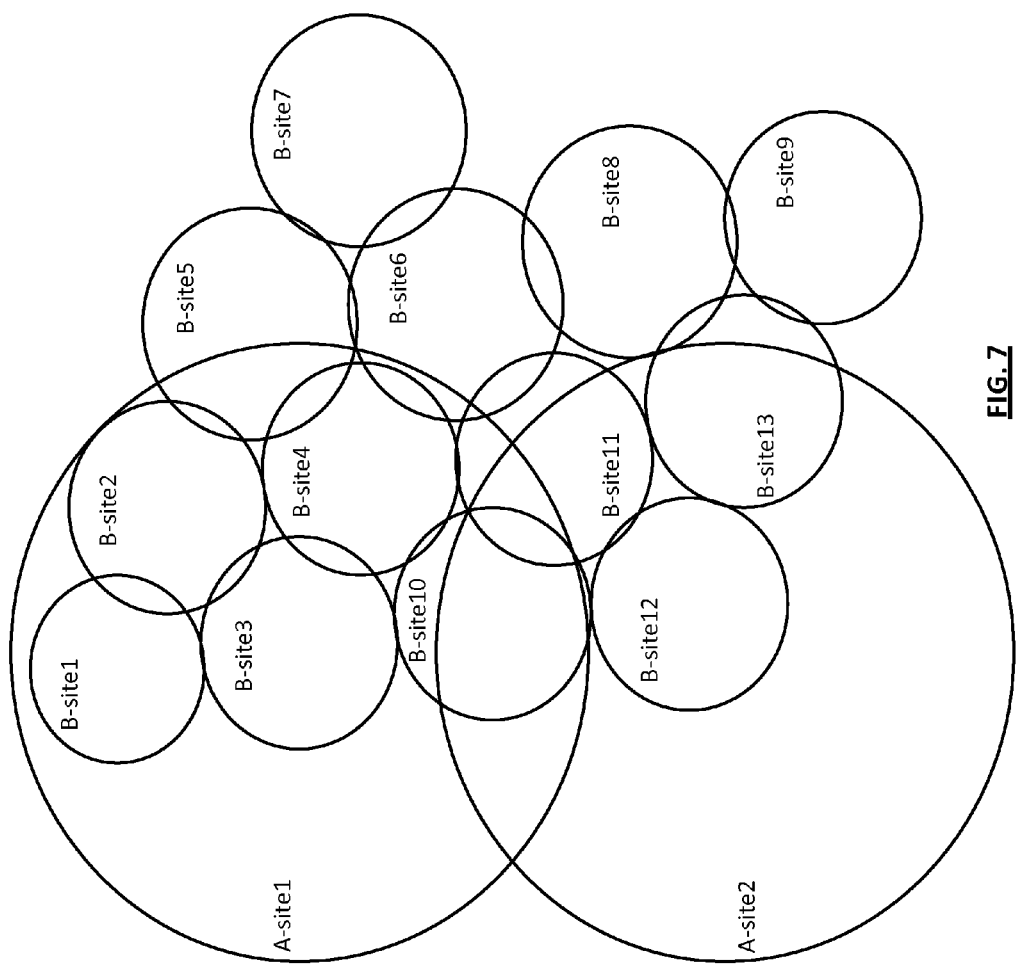

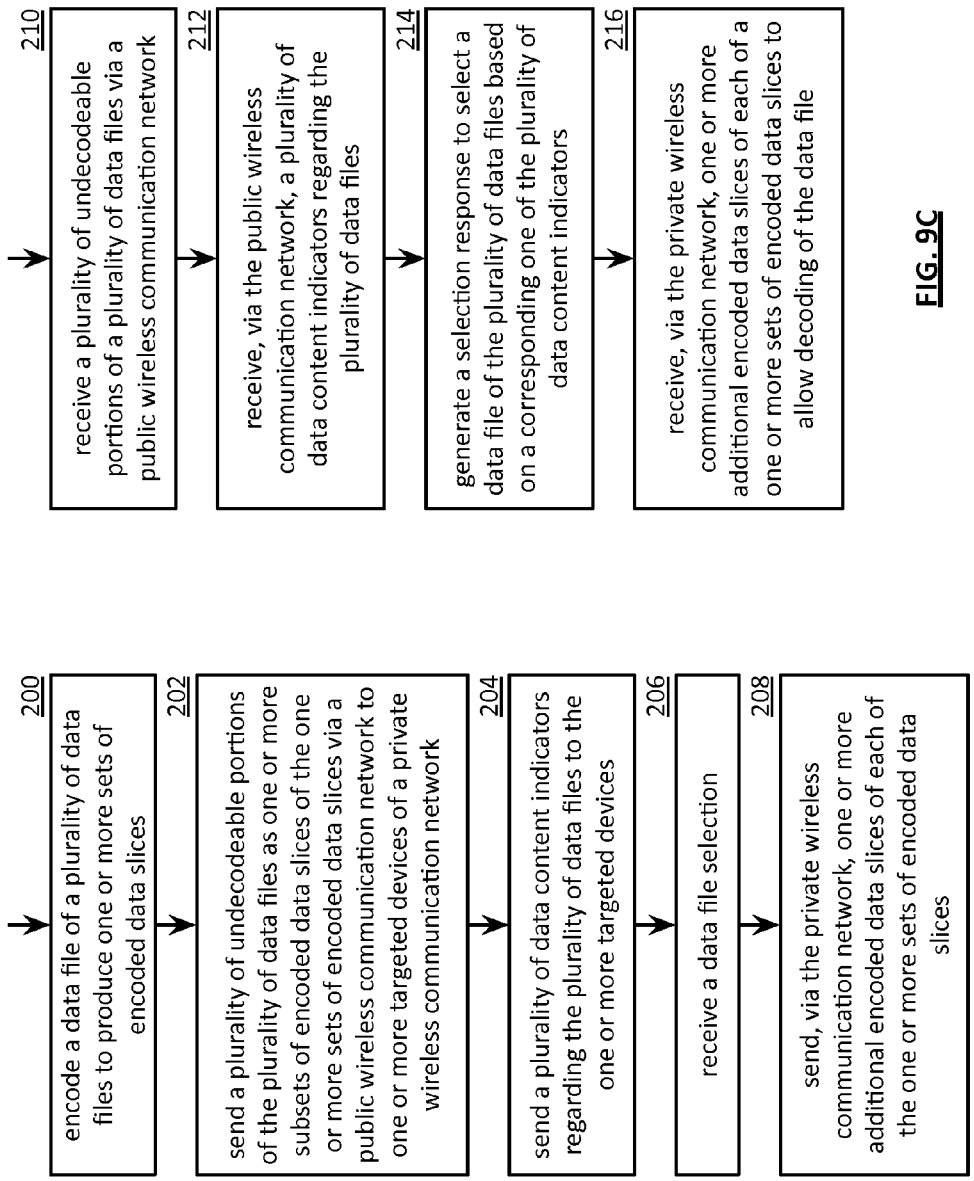

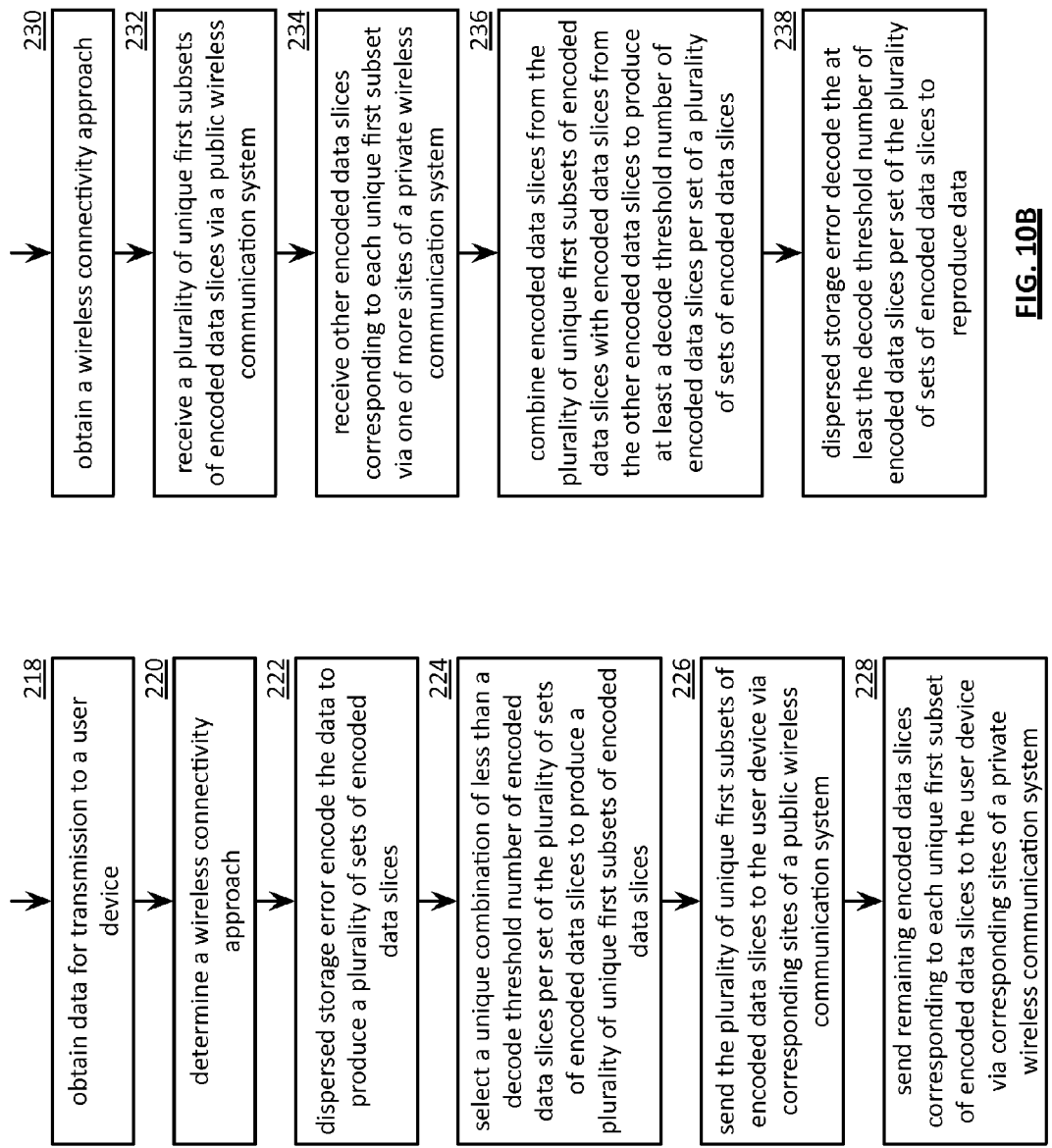

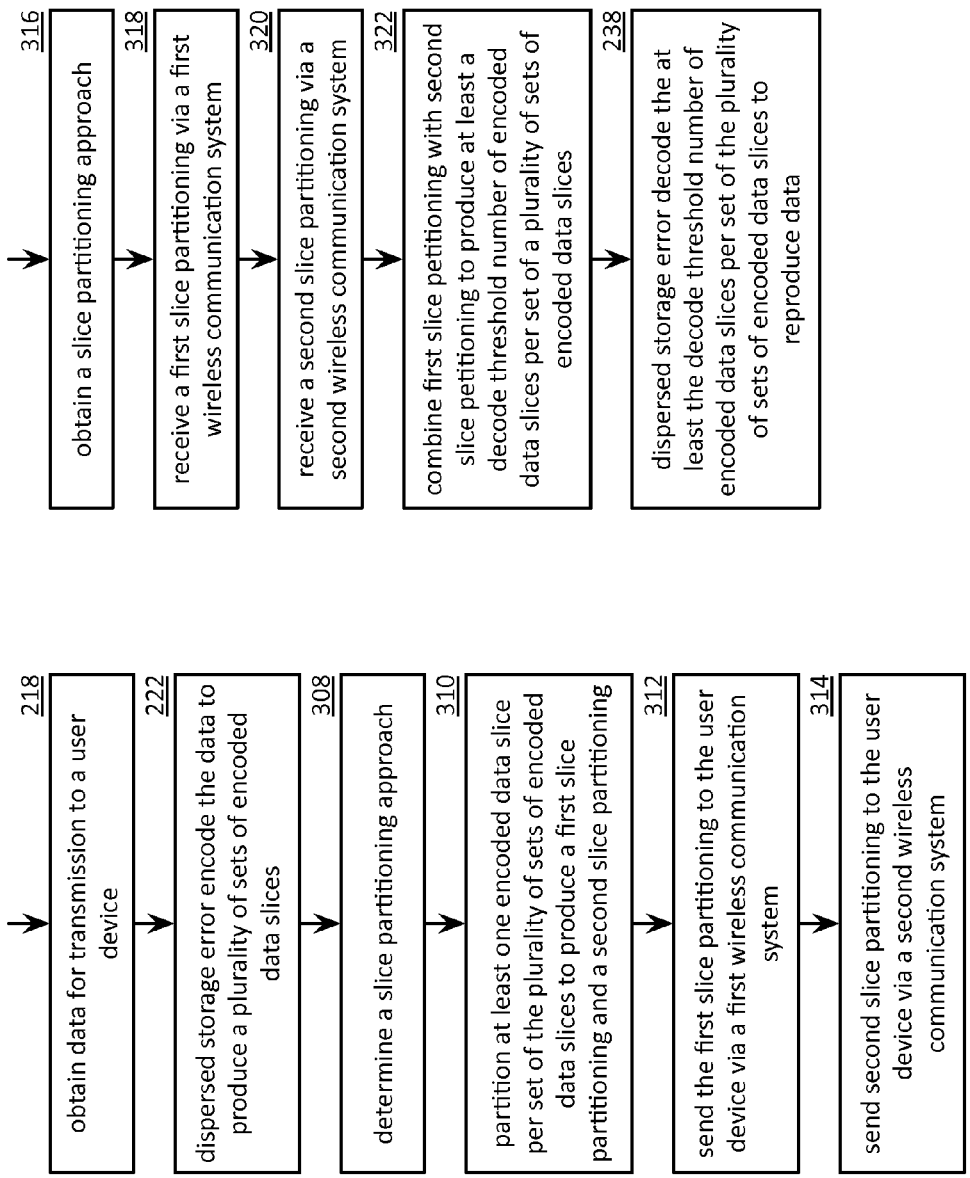

ACQUIRING A TRUSTED SET OF ENCODED DATA SLICES

CROSS REFERENCE TO RELATED PATENTS

The present U.S. Utility patent application claims priority pursuant to 35 U.S.C. §120 as a continuation of U.S. Utility application Ser. No. 13/647,533, entitled "ACQUIRING A TRUSTED SET OF ENCODED DATA SLICES", filed Oct. 9, 2012, issuing as U.S. Pat. No. 8,839,368, on Sep. 16, 2014, which claims priority pursuant to 35 U.S.C. §119(e) to U.S. Provisional Application No. 61/554,152, entitled "COMMUNICATING DATA UTILIZING DATA DISPERSAL", filed Nov. 1, 2011, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc., are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 7 is a diagram illustrating an example of wireless communication system coverage in accordance with the present invention;

FIG. 9B is a flowchart illustrating another example of sending data in accordance with the present invention;

FIG. 9C is a flowchart illustrating an example of receiving data in accordance with the present invention;

FIG. 10A is a flowchart illustrating another example of sending data in accordance with the present invention;

FIG. 10B is a flowchart illustrating another example of receiving data in accordance with the present invention;

FIG. 13A is a flowchart illustrating another example of sending data in accordance with the present invention; and FIG. 13B is a flowchart illustrating another example of receiving data in accordance with the present invention.

DETAILED DESCRIPTION OF THE INVENTION

Figure 1:
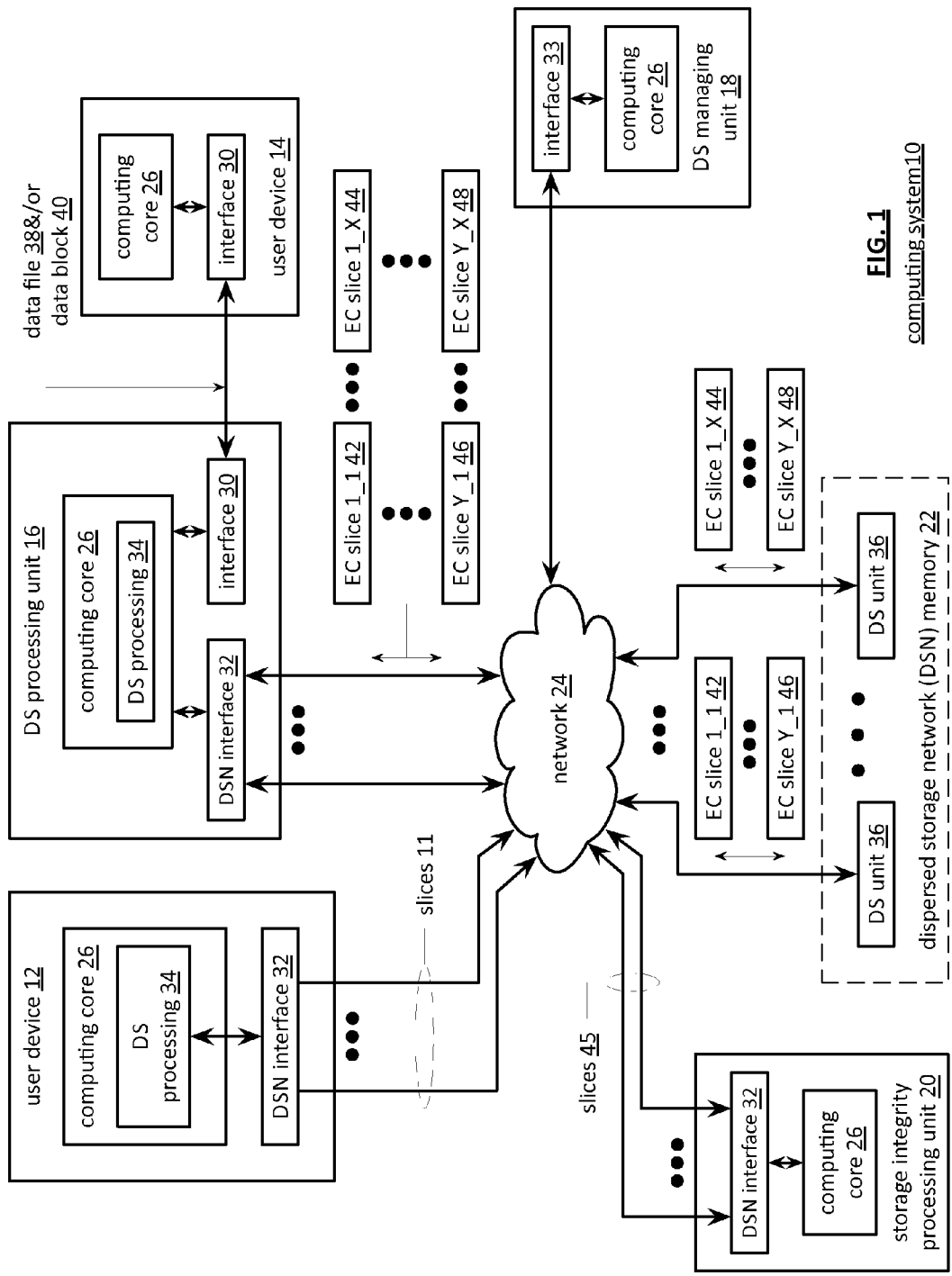
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
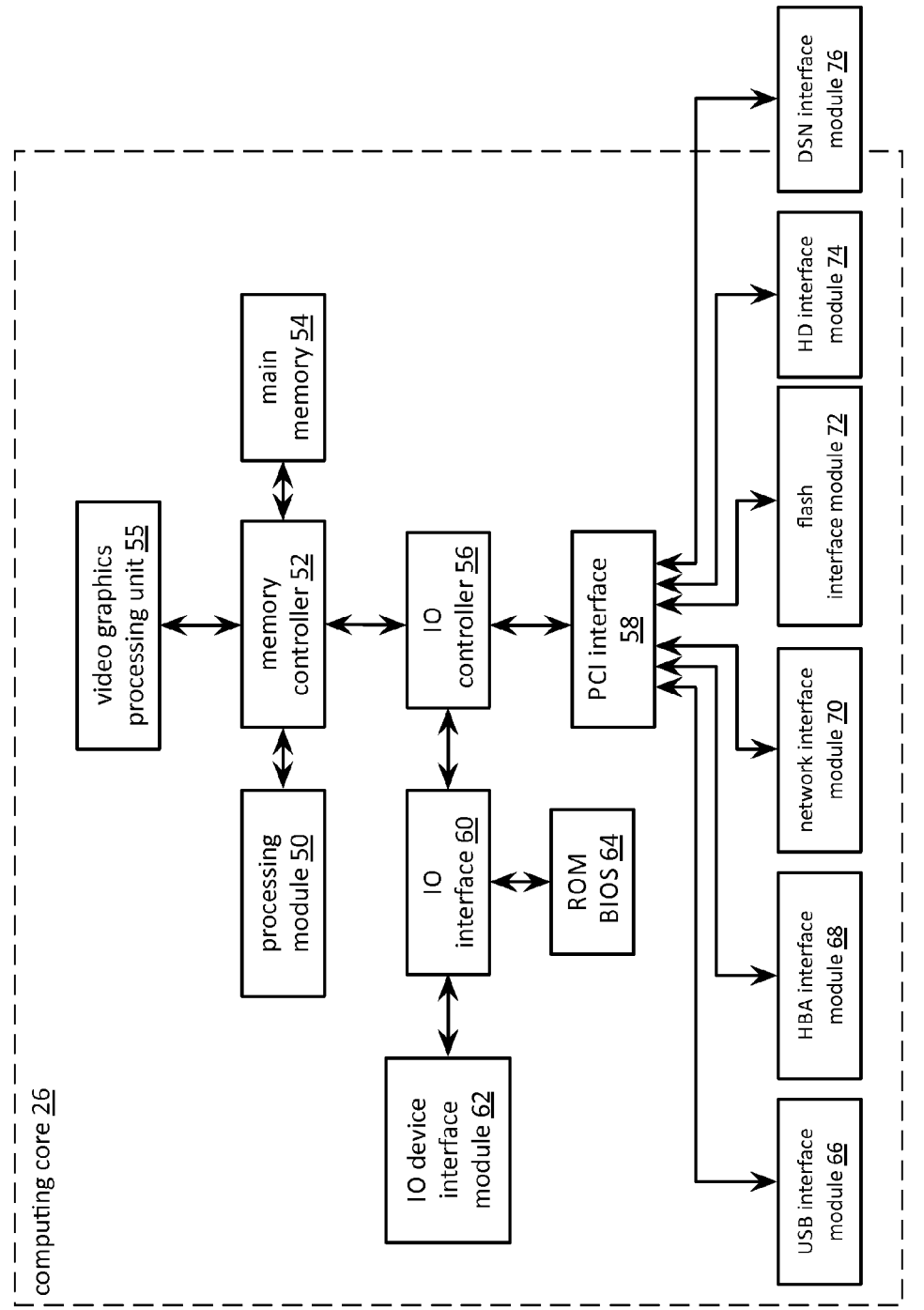
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
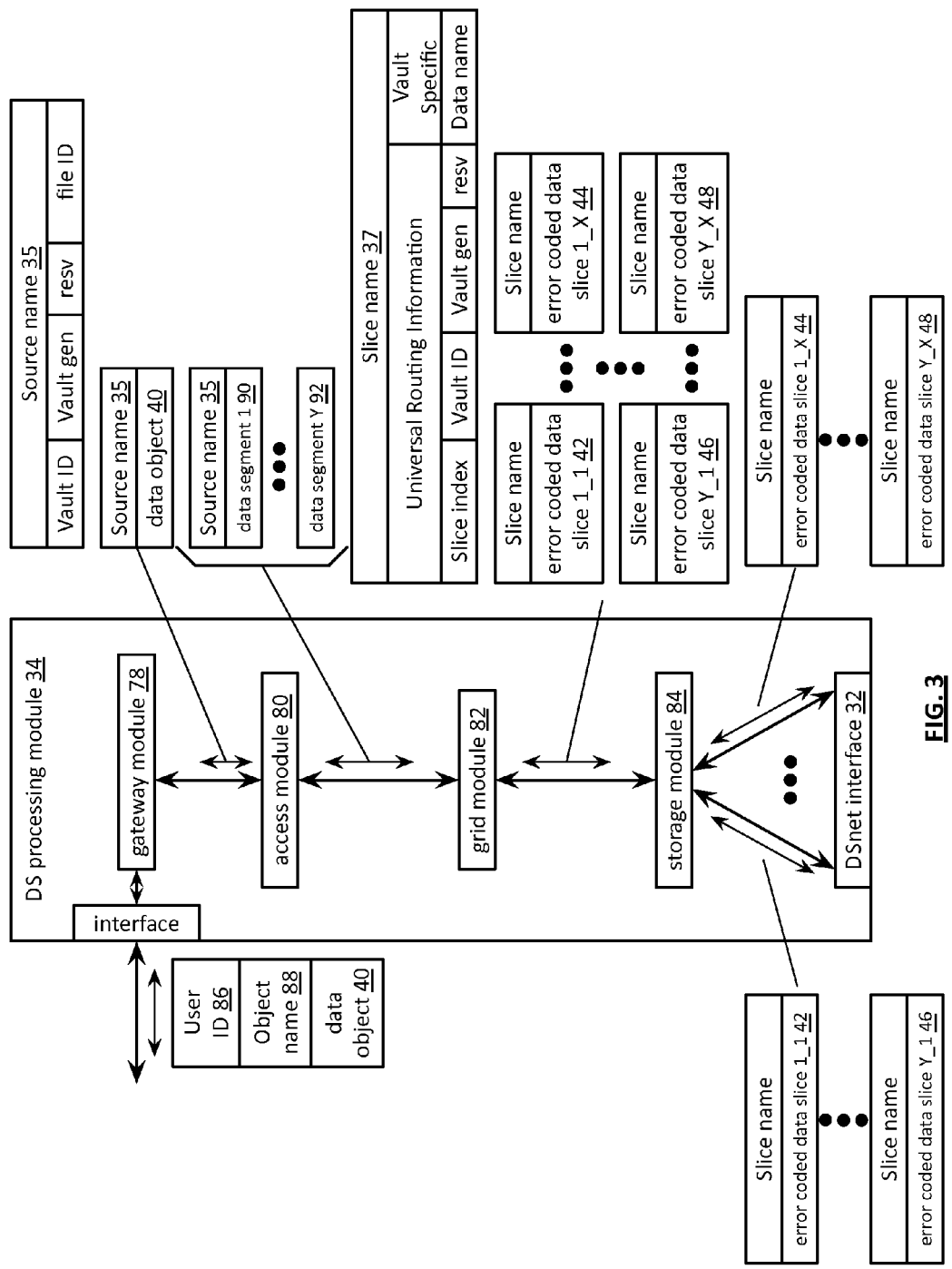
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc., of the data segment 94 reducing the impact of consecutive bit, byte, data word, etc., failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
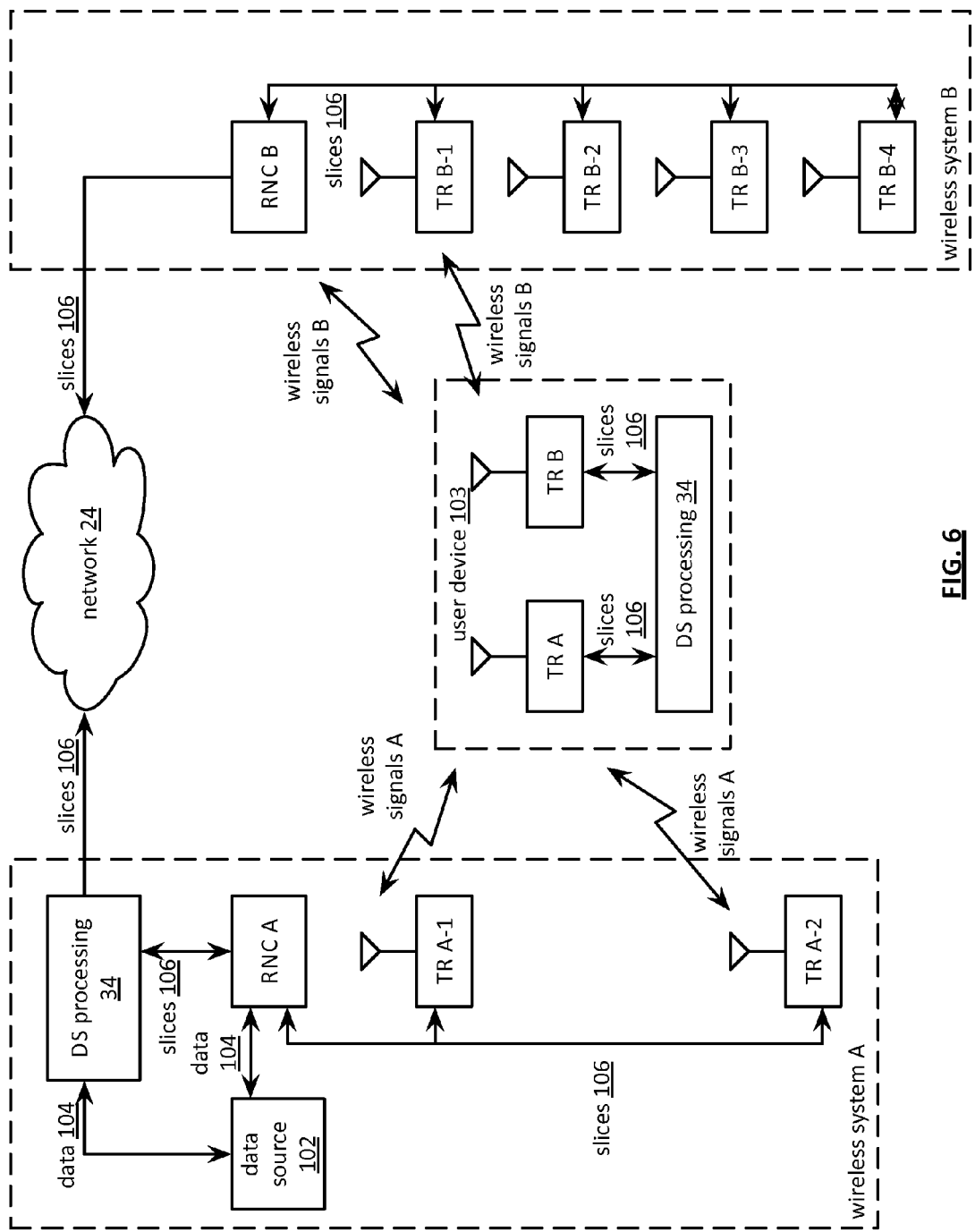
FIG. 6 is a schematic block diagram of another embodiment of a computing system in accordance with the present invention.

FIG. 6 is a schematic block diagram of another embodiment of a computing system that includes a user device 103, a wireless system A, a wireless system B, and a network 24. Alternatively, the system includes any number of wireless systems and any number of user devices. The wireless system A includes a dispersed storage (DS) processing 34, a data source 102, a radio network controller (RNC) A, and wireless transceivers TR A-1 and TR A-2. Alternatively, the wireless system A may include any number of data sources and any number of wireless transceivers. The data source 102 may be implemented utilizing one or more of an application server, a database, a data aggregator, a recording system output, a streaming media source, a dispersed storage network (DSN) memory, and a communication system output (e.g., cellular phone call traffic, radio dispatch traffic). The data source 102 receives data from one or more inputs including a data output from the RNC A. The data source 102 provides data 104 to the DS processing unit 34. The data 104 includes one or more of encoded data slices, a data segment, a data file, a data stream, application data, commands, configuration information, communication traffic (e.g., telephony, group radio dispatch traffic), a video stream, an audio stream, a text file, a multimedia file, a database update, a list, reference information, and training information.

The DS processing 34 encodes the data 104 to produce slices 106. The DS processing 34 sends at least some of the slices 106 to the user device 103 via at least one of RNC A and wireless system B. The RNC A sends slices 106 to one or more of TR A-1 and TR A-2 for wireless transmission as wireless signals A to the user device 103. The RNC A controls session continuity as the user device 103 may move geographically from site to site within a geographic coverage area of wireless system A.

The wireless system B includes a RNC B and wireless transceivers TR B-1, TR B-2, TR B-3, and TR B-4. Alternatively, the wireless system B may includes any number of wireless transceivers. The RNC B receive slices 106 from the wireless system A and sends slices 106 to one or more of TR B-1, TR B-2, TR B-3, and TR B-4 for wireless transmission as wireless signals B to the user device 103. The RNC B controls session continuity as the user device 103 moves geographically from site to site within a geographic coverage area of wireless system B.

The user device 103 includes a transceiver TR A to communicate wireless signals A and a transceiver TR B to communicate wireless signals B. The TR A receives wireless signals A and produces slices 106. The TR B receives wireless signals B and produces slices 106. The DS processing 34 of the user device 103 receives the slices 106 from one or more of TR A and TR B and decodes the slices 106 to reproduce data 104. Alternatively, a single transceiver may communicate wireless signals A and B. For example, the single transceiver communicates wireless signals A and B when the single transceiver is implemented utilizing software defined radio (SDR) technology.

The transceivers TR A-1 and TR A-2 communicate wireless signals A with transceiver TR A of the user device 103 and may operate in accordance with one or more wireless industry standards including but not limited to universal mobile telecommunications system (UMTS), global system for mobile communications (GSM), long term evolution (LTE), wideband code division multiplexing (WCDMA), IEEE 802.11, IEEE 802.16, WiMax, Bluetooth, Association of Public Safety Communications Officers (APCO) Project 25, or any other local area network (LAN), wide area network (WAN), personal area network (PAN) or like wireless protocol. The transceivers TR B-1, TR B-2, TR B-3, and TR B-4 to communicate wireless signals B with the transceiver TR B of the user device and may operate in accordance with the one or more wireless standards. The wireless signals A and B may simultaneously operate in accordance with different wireless industry standards. The wireless signals may be transmitted in accordance with any one of a broadcast scheme, a unicast scheme, and a multicast scheme.

The wireless system A may provide a different wireless coverage footprint as compared to wireless system B. For example, wireless system A may provide a private wireless system (e.g., police and fire department communication) where range per site and total cost is more important than high user density per unit of area covered. As another example wireless system B may provide a public wireless system (e.g., a cellular carrier) where low-cost per user and a high density per unit of area covered is more important than wireless range per site. For instance, wireless coverage cells of wireless system A may be much larger in diameter than wireless coverage cells of wireless system B. Wireless coverage permutations are discussed in more detail with reference to FIG. 7.

FIG. 7 is a diagram illustrating an example of wireless communication system coverage that includes a plurality of wireless system A coverage cells A-site1 through A-site2 and a plurality of wireless system B coverage cells B-site1 through B-site13. The wireless system A includes wireless coverage cells that are larger than coverage cells of the wireless system B. At any geographic location, coverage may be provided from neither, one, or both wireless systems A and B. With respect to the coverage from one of the two wireless systems A and B, overlapping coverage may be provided by two sites of the same wireless system.

Individual cells of wireless system B provide at least one of unique coverage (e.g., not overlapping with wireless system A), partially overlapping coverage, and fully overlapping coverage (e.g., a cell of wireless system A fully overlaps coverage of a site of wireless system B). For example, wireless system B sites B-site7 through B-site9 provide unique coverage, wireless system B sites B-site5 and B-site6 provide partially overlapping coverage with wireless system A site A-site1, wireless system B site B-site11 provides partially overlapping coverage with wireless system A sites A-site1 and A-site2, wireless system B site B-site13 provides partially overlapping coverage with wireless system A site A-site2, wireless system B site B-site10 provides fully overlapping coverage with wireless system A sites A-site1 and A-site2, wireless system B sites B-site1 through B-site4 provides fully overlapping coverage with wireless system A site A-site1, and wireless system B site B-site12 provides fully overlapping coverage with wireless system A site A-site2.

A system performance and security improvement may be provided by leveraging coverage characteristics of wireless systems A and B to wirelessly communicate data as encoded data slices to a user device that traverses an aggregate coverage area of both of the wireless systems. Methods to communicate the data to the user device are discussed in greater detail with reference to FIGS. 8A-13B.

Figure 8A:
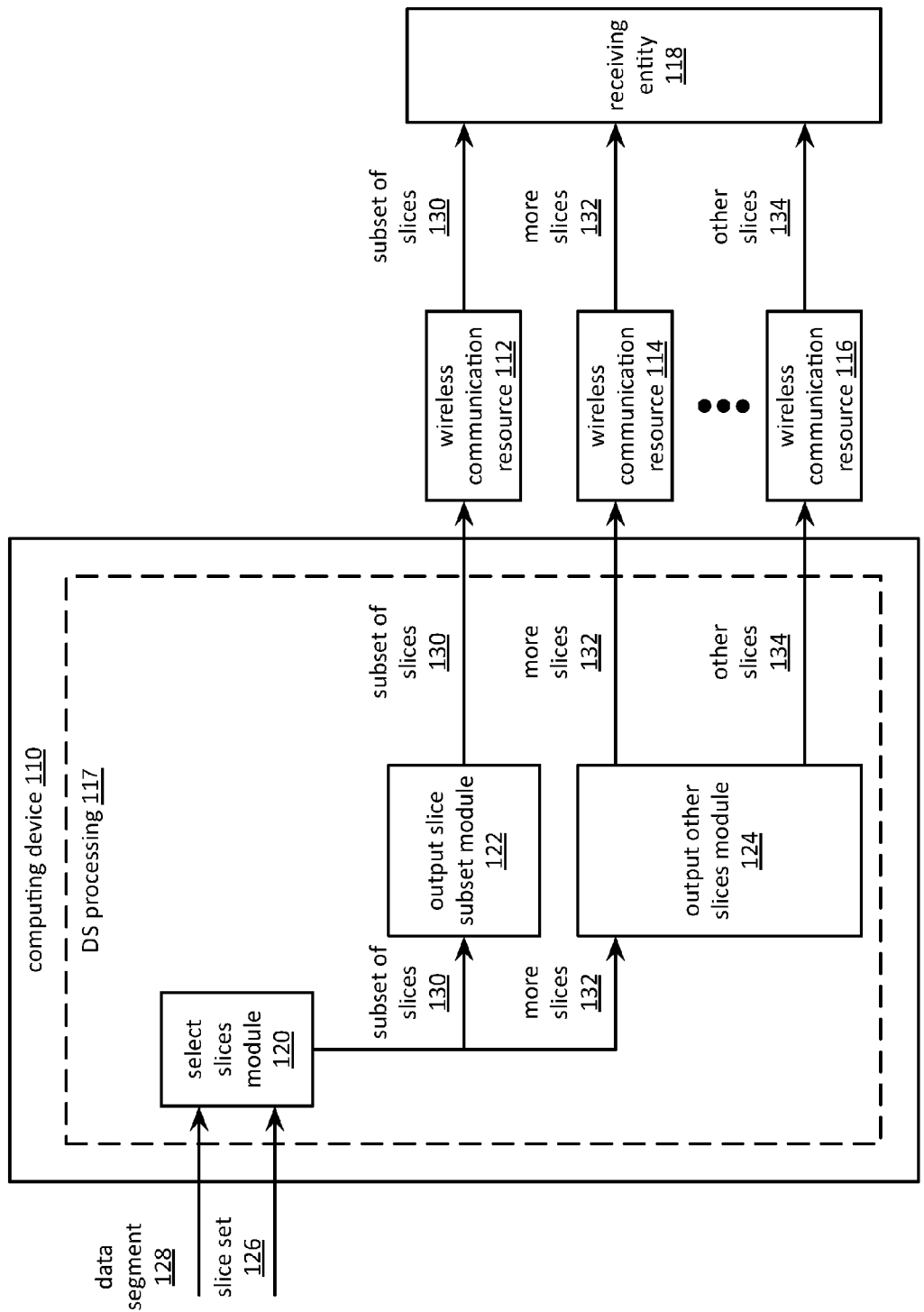
FIG. 8A is a schematic block diagram of another embodiment of a computing system in accordance with the present invention.

FIG. 8A is a schematic block diagram of another embodiment of a computing system that includes a computing device 110, a plurality of wireless communication resources 112-116, and a receiving entity 118. The receiving entity 118 may be implemented as one or more of a user device, a dispersed storage (DS) unit, and a DS processing unit. Each wireless communication resource of the plurality of wireless communication resources 112-116 may include one or more of wireless signals, a wireless channel, a wireless transceiver, a wireless communication sector, a wireless communication site, and a wireless communication system. The wireless channel may operate in accordance with one or more industry standards including frequency division multiple access, (FDMA), code division multiple access (CDMA), and time division multiple access (TDMA). The computing device 110 includes a DS processing 117. The DS processing 117 includes a select slices module 120, an output slice subset module 122, and an output other slices module 124. The system functions to communicate a set of encoded data slices 126 to the receiving entity 118. A data segment 128 is encoded utilizing a dispersed storage error coding function to produce the set of encoded data slices 126.

The select slices module 120 selects a subset of slices 130 of the set of encoded data slices 126 to communicate to the receiving entity 118. The subset of encoded data slices 130 includes less than a decode threshold number of encoded data slices. The select slices module 120 selects the subset of encoded data slices 130 by a series of steps. A first step includes determining a subset number of encoded data slices for the subset of encoded data slices 130 based on one or more of an availability level of a first wireless communication resource 112, a communication performance level of the first wireless communication resource (e.g., bandwidth, latency, rate), and one or more dispersal parameters of the dispersed storage error coding function (e.g., pillar width, decode threshold). For example, the select slices module 120 selects a below average number of encoded data slices when the communication performance level of the first wireless communication resource is below average. A second step to select the subset of encoded data slices includes selecting the subset of encoded data slices 130 based on one or more of the subset number of encoded data slices, an encoding matrix of the dispersed storage error coding function, and content of the set of encoded data slices. For example, the select slices module 120 selects encoded data slices where content of the encoded data slices does not expose sensitive data.

When the receiving entity 118 is affiliated (e.g., operably coupled) with the first wireless communication resource 112, the output slice subset module 122 outputs the subset of encoded data slices 130 via the first wireless communication resource 112 to the receiving entity 118. For example, the output slice subset module 122 sends the subset of encoded data slices 130 to a cell site of the first wireless communication resource 112. As another example, the output slice subset module 122 sends the subset of encoded data slices 130 to a radio network controller associated with the first wireless communication resource 112. The first wireless communication resource 112 has a first wireless geographic coverage area. The output slice subset module 122 determines that the receiving entity 118 is affiliated with the first wireless communication resource 112 based on at least one of receiving an affiliation message (e.g., from at least one of the receiving entity 118 and the radio network controller), initiating an affiliation query and receiving a favorable response, and predicting a favorable geographic proximity between the receiving entity and the first wireless communication resource 112.

When the receiving entity 118 is affiliated with a second wireless communication resource 114 and is located outside of the first wireless geographic coverage area, the output other slices module 124 outputs one or more encoded data slices 132 of the set of encoded data slices 126 via the second wireless communication resource 114 to the receiving entity 118. The subset of encoded data slices 130 and the one or more encoded data slices 132 equates to at least the decode threshold number of encoded data slices. The first wireless communication resource 112 may include one or more channels in a first cell site of a communication system and the second wireless communication resource 114 may include one or more channels in a second cell site of the communication system. Alternatively, first wireless communication resource includes one or more channels in a cell site of a first communication system 112 and the second wireless communication resource 114 includes one or more channels in a cell site of a second communication system. At least a portion of the cell site of the second communication system does not overlap with the cell site of the first communication system. The output other slices module 124 determines that the receiving entity is affiliated with the second wireless communication resource 114 based on at least one of receiving an affiliation message, initiating an affiliation query and receiving a favorable response, and predicting a favorable geographic proximity between the receiving entity and the second wireless communication resource.

When the receiving entity 118 is affiliated with a third wireless communication resource 116 and is located outside of the first wireless geographic coverage area and a second wireless geographic coverage area, the third module outputs another one or more encoded data slices 134 of the set of encoded data slices 126 via the third wireless communication resource 116 to the receiving entity 118. The second wireless communication resource 114 has the second wireless geographic coverage area and the subset of encoded data slices 130, the one or more encoded data slices 132, and the another one or more encoded data slices 134 equates to at least the decode threshold number of encoded data slices.

Figure 8B:
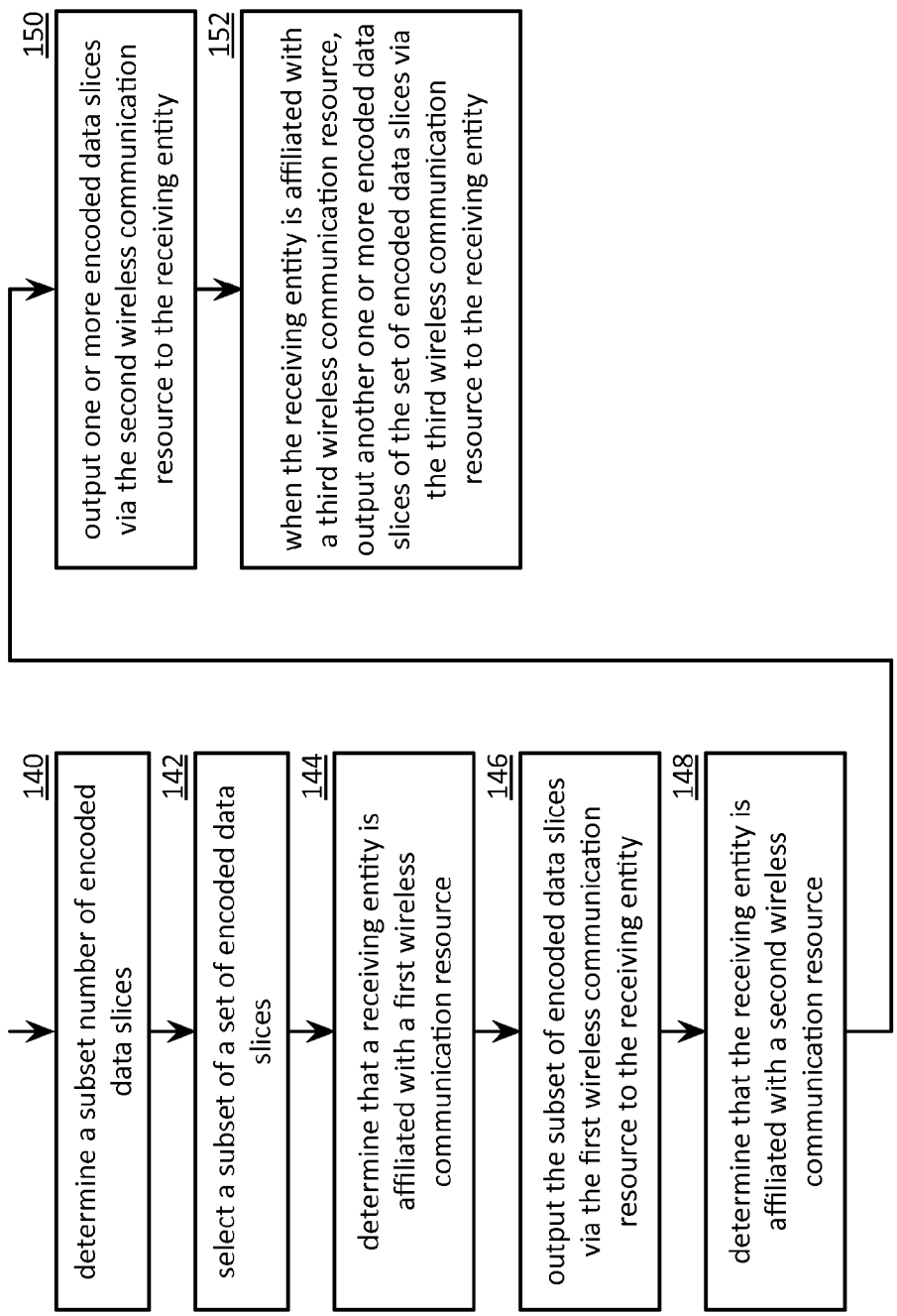
FIG. 8B is a flowchart illustrating an example of sending data in accordance with the present invention.

FIG. 8B is a flowchart illustrating an example of sending data. The method begins at step 140 where a processing module (e.g., a dispersed storage (DS) module of a sending entity) determines a subset number of encoded data slices for a subset of encoded data slices of a set of encoded data slices to communicate to a receiving entity based on one or more of an availability level of a first wireless communication resource, a communication performance level of the first wireless communication resource, and one or more dispersal parameters of a dispersed storage error coding function. A data segment is encoded utilizing the dispersed storage error coding function to produce a set of encoded data slices.

The method continues at step 142 where the processing module selects the subset of the set of encoded data slices. The subset of encoded data slices includes less than a decode threshold number of encoded data slices. The selecting the subset of encoded data slices includes selecting the subset of encoded data slices based on one or more of the subset number of encoded data slices, an encoding matrix of the dispersed storage error coding function, and content of the set of encoded data slices.

The method continues at step 144 where the processing module determines that the receiving entity is affiliated with the first wireless communication resource based on at least one of receiving an affiliation message, initiating an affiliation query and receiving a favorable response, and predicting a favorable geographic proximity between the receiving entity and the first communication resource. When the receiving entity is affiliated with a first wireless communication resource, the method continues at step 146 where the processing module outputs the subset of encoded data slices via the first wireless communication resource to the receiving entity. The first wireless communication resource has a first wireless geographic coverage area.

The method continues at step 148 where the processing module determines that the receiving entity is affiliated with the second wireless communication resource based on at least one of receiving an affiliation message, initiating an affiliation query and receiving a favorable response, and predicting a favorable geographic proximity between the receiving entity and the second communication resource. When the receiving entity is affiliated with a second wireless communication resource and is located outside of the first wireless geographic coverage area, the method continues at step 150 where the processing module outputs one or more encoded data slices of the set of encoded data slices via the second wireless communication resource to the receiving entity. The subset of encoded data slices and the one or more encoded data slices equates to at least the decode threshold number of encoded data slices. The first wireless communication resource includes one or more channels in a first cell site of a communication system and the second wireless communication resource including one or more channels in a second cell site of the communication system. Alternatively, the first wireless communication resource includes one or more channels in a cell site of a first communication system and the second wireless communication resource includes one or more channels in a cell site of a second communication system, wherein at least a portion of the cell site of the second communication system does not overlap with the cell site of the first communication system.

When the receiving entity is affiliated with a third wireless communication resource and is located outside of the first wireless geographic coverage area and a second wireless geographic coverage area, the method continues at step 152 where the processing module outputs another one or more encoded data slices of the set of encoded data slices via the third wireless communication resource to the receiving entity, wherein the second wireless communication resource has the second wireless geographic coverage area and wherein the subset of encoded data slices, the one or more encoded data slices, and the another one or more encoded data slices equates to at least the decode threshold number of encoded data slices.

Figure 9A:
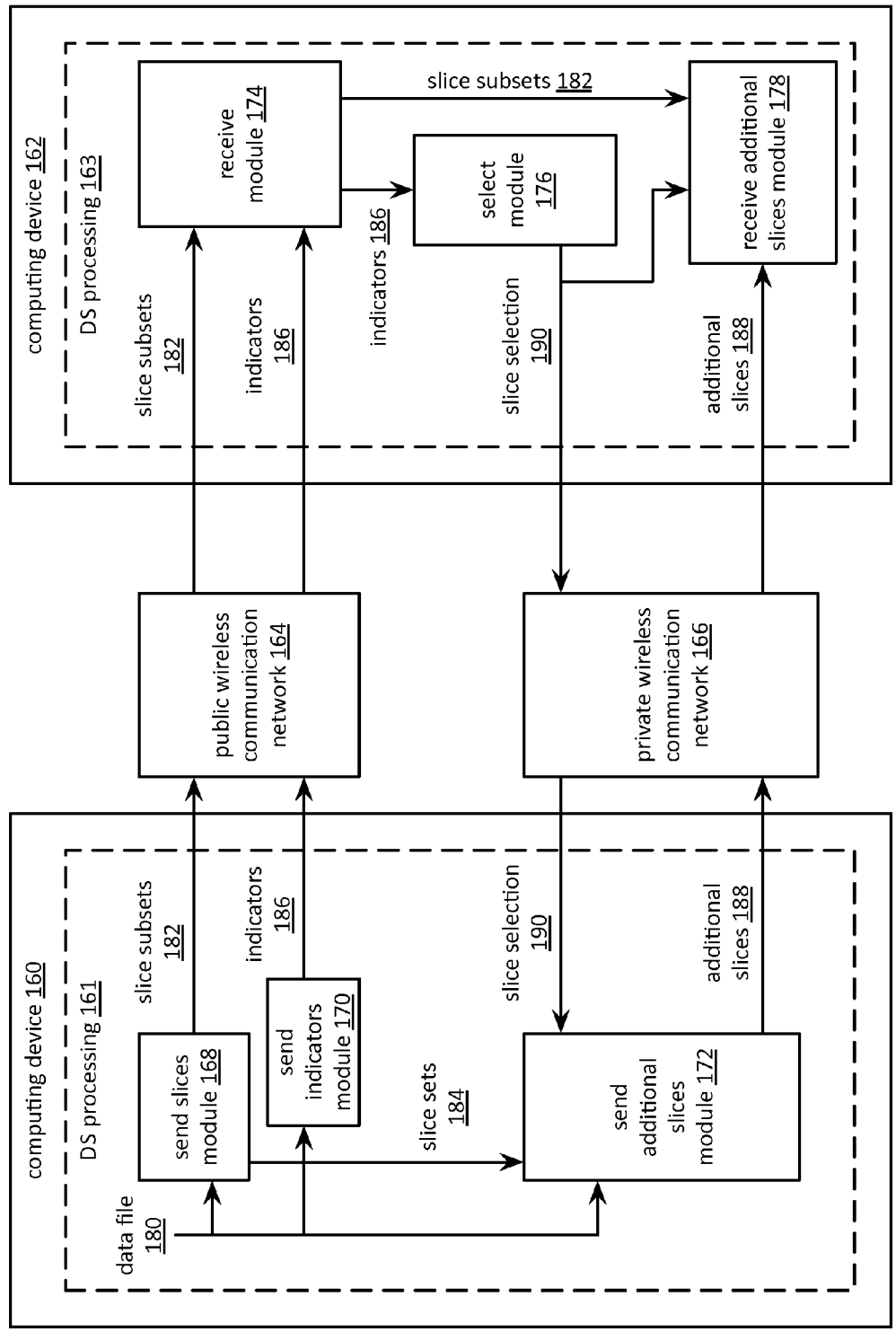
FIG. 9A is a schematic block diagram of another embodiment of a computing system in accordance with the present invention.

FIG. 9A is a schematic block diagram of another embodiment of a computing system that includes computing devices 160 and 162, a public wireless communication network 164, and a private wireless communication network 166. The public wireless communication network 164 includes at least one of a public wireless local area network, a public cellular network, a public broadband network, a public satellite network, and a public internet. The private wireless communication network 166 includes at least one of a private wireless local area network, a private cellular network, a private two-way radio network, a private broadband network, a private satellite network, a private governmental wireless network, and a private intranet. Alternatively, the public wireless communication network 164 may be implemented with any communication network technology associated with higher capacity than the private wireless communication network 166. Alternatively, the private wireless communication network 166 may be implemented with any communication network technology associated with higher security than the public wireless communication network 164.

The computing device 160 includes a dispersed storage (DS) processing 161. The computing device 162 includes a DS processing 163. The DS processing 161 includes a send slices module 168, a send indicators module 170, and a send additional slices module 172. The DS processing 163 includes a receive module 174, a select module 176, and a receive additional slices module 178. The computing devices 160 and 162 may be implemented as one or more of a user device, a DS processing unit, and a DS unit. The computing device 160 may be implemented as a sending device and the computing device 162 may be implemented as a targeted device of a plurality of targeted devices. The system functions to send a data file 180 of a plurality of data files from computing device 160 (e.g., sending device) to computing device 162 (e.g., targeted device).

The send slices module 168 sends a plurality of undecodeable portions of the plurality of data files via the public wireless communication network 164 to one or more targeted devices 162 of the private wireless communication network 166. An undecodeable portion of the data file 180 of the plurality of undecodeable portions represents one or more subsets of encoded data slices 182 of one or more sets of encoded data slices 184. The data file 180 is encoded using a dispersed storage error coding function to produce the one or more sets of encoded data slices. For example, the send slices module 168 obtains the data file 180 and encodes the data file 180 using the dispersed storage error coding function to produce the one or more sets of encoded data slices 184. The receive module 174 receives the plurality of undecodeable portions of the plurality of data files via the public wireless communication network 164.

The one or more targeted devices 162 includes the plurality of targeted devices. A subset of the one or more subsets of encoded data slices 182 includes less than the decode threshold number of encoded data slices such that the data file 180 is undecodeable from the less than the decode threshold number of encoded data slices. The one or more subsets of encoded data slices 182 includes a plurality of subsets of encoded data slices. Alternatively, from subset to subset of the plurality of encoded data slices 184, the plurality of encoded data slices includes a different combination of encoded data blocks of the data file (e.g., different pillar combinations, different check block combinations, etc.). When sending the plurality of undecodeable portions of the plurality of data files by sending subsets of the plurality of encoded data slices 184 with different combinations of encoded data blocks, the send slices module 168 determines a pillar combination (e.g., which slice numbers) of the subset of encoded data slices based on one or more of a previous pillar combination associated with another set of encoded data slices, an encoding matrix of the dispersed storage error coding function, and content of each encoded data slice of the set of encoded data slices; and (e.g., to provide improved security).

The send indicators module 170 sends a plurality of data content indicators 186 regarding the plurality of data files via the public wireless communication network 164 to the one or more targeted devices 162 of the private wireless communication network 166. The data content indicators 186 includes one of a non-confidential description of the data file, a video graphic thumbnail of the data file, non-classified information of the data file, and a data file name. Alternatively, the data content indicators 186 provide the one or more targeted devices 162 with any type of description of the plurality of data files to enable a selection.

The receive module 174 receives, via the public wireless communication network 164, the plurality of data content indicators regarding the plurality of data files. The select module 176 generates a selection response 190 to select the data file 180 of the plurality of data files based on a corresponding one of the plurality of data content indicators 186. The select module 176 generates the selection response 190 by at least one of a plurality of approaches. A first approach includes an automated process based on at least one of a task, a geographic location, a group identification, and a time period. For example, the select module 176 generates the selection response 190 when a task associated with the data file 180 corresponds to a task assignment. As another example, the select module 176 generates the selection response 190 when a geographic location associated with the data file 180 corresponds to a current geographic location. As yet another example, the select module 176 generates the selection response 190 when a group identifier associated with the data file corresponds to a present group identifier. As a still further example, the select module 176 generates the selection response 190 when a time period associated with the data file corresponds to a current time period. A second approach includes a user selection detection process where the selection response includes identification (e.g., based on a user input) of the selected data file.

In response to a selection 190 of the data file 180 of the plurality of data files based on a corresponding one of the plurality of data content indicators 186, the send additional slices module 172 sends, via the private wireless communication network 166, one or more additional encoded data slices 188 of each of the one or more sets of encoded data slices 184 such that, for each of the one or more sets of encoded data slices, the one or more targeted devices obtains at least a decode threshold number of encoded data slices to decode the data file. A targeted device 162 of the plurality of devices provides the selection 190 and the one or more additional encoded data slices 188 of each of the one or more sets of encoded data slices 184 are sent to the targeted device 162. The targeted device 162 of the plurality of device provides the selection 190 via the private wireless communication network 166. Alternatively, the targeted device 162 of the plurality of device provides the selection 190 and the one or more additional encoded data slices 188 of each of the one or more sets of encoded data slices 184 are sent to the plurality of targeted devices. The receive additional slices module 178 receives, via the private wireless communication network 166, the one or more additional encoded data slices 188 of each of the one or more sets of encoded data slices 184 such that, for each of the one or more sets of encoded data slices 184, at least a decode threshold number of encoded data slices is obtained to allow decoding of the data file 180.

FIG. 9B is a flowchart illustrating another example of sending data. The method begins at step 200 were a processing module (e.g., a dispersed processing of a sending device) encodes a plurality of data files using a dispersed storage error coding function to produce, for each data file, one or more sets of encoded data slices. The method continues at step 202 where the processing module sends a plurality of undecodeable portions of the plurality of data files via a public wireless communication network to one or more targeted devices of a private wireless communication network. The one or more targeted devices includes a plurality of targeted devices. An undecodeable portion of a data file of the plurality of undecodeable portions represents one or more subsets of encoded data slices of the one or more sets of encoded data slices corresponding to the data file. The one or more subsets of encoded data slices includes a plurality of subsets of encoded data slices. A subset of the one or more subsets of encoded data slices includes less than the decode threshold number of encoded data slices such that the data file is undecodeable from the less than the decode threshold number of encoded data slices. Alternatively, from subset to subset of the plurality of encoded data slices, the plurality of encoded data slices includes a different combination of encoded data blocks of the data file (e.g., different pillar combinations, different check block combinations, etc.).

The method continues at step 204 where the processing module sends a plurality of data content indicators regarding the plurality of data files. The data content indicators includes at least one of a non-confidential description of the data file, a video graphic thumbnail of the data file, non-classified information of the data file, and a data file name. The method continues at step 206 where the processing module receives a selection when a targeted device of the plurality of device provides the selection.

In response to the selection of a data file of the plurality of data files based on a corresponding one of the plurality of data content indicators, the method continues at step 208 where the processing module sends, via the private wireless communication network, one or more additional encoded data slices of each of the one or more sets of encoded data slices such that, for each of the one or more sets of encoded data slices, the one or more targeted devices obtains at least a decode threshold number of encoded data slices to decode the data file. For example, the one or more additional encoded data slices of each of the one or more sets of encoded data slices are sent to the targeted device. As another example, the one or more additional encoded data slices of each of the one or more sets of encoded data slices are sent to the plurality of targeted devices.

FIG. 9C is a flowchart illustrating an example of receiving data. The method begins at step 210 were a processing module (e.g., a dispersed processing of a targeted device) receives a plurality of undecodeable portions of a plurality of data files via a public wireless communication network. The undecodeable portion of a data file of the plurality of undecodeable portions represents one or more subsets of encoded data slices of one or more sets of encoded data slices. The data file is encoded using a dispersed storage error coding function to produce the one or more sets of encoded data slices. A subset of the one or more subsets of encoded data slices includes less than the decode threshold number of encoded data slices such that the data file is undecodeable from the less than the decode threshold number of encoded data slices. The one or more subsets of encoded data slices includes a plurality of subsets of encoded data slices. Alternatively, from subset to subset of the plurality of encoded data slices, the plurality of encoded data slices includes a different combination of encoded data blocks of the data file.

The method continues at step 212 where the processing module receives, via the public wireless communication network, a plurality of data content indicators regarding the plurality of data files. The data content indicators includes at least one of a non-confidential description of the data file, a video graphic thumbnail of the data file, non-classified information of the data file, and a data file name.

The method continues at step 214 where the processing module generates a selection response to select a data file of the plurality of data files based on a corresponding one of the plurality of data content indicators. The generating the selection response includes at least one of a variety of approaches. A first approach includes an automated process based on at least one of a task, a geographic location, a group identification, and a time period. A second approach includes a user selection detection process, wherein the selection response includes identification of the selected data file (e.g., a user input). Next, the processing module outputs, via the private wireless communication network, the selection response to a sending entity. The method continues at step 216 where the processing module receives, via the private wireless communication network, one or more additional encoded data slices of each of the one or more sets of encoded data slices such that, for each of the one or more sets of encoded data slices, at least a decode threshold number of encoded data slices is obtained to allow decoding of the data file.

FIG. 10A is a flowchart illustrating another example of sending data. The method begins with step 218 where a processing module (e.g., a dispersed storage (DS) processing of an infrastructure element) obtains data for transmission to a user device (e.g., receives the data). The method continues at step 220 where the processing module determines a wireless connectivity approach. The wireless connectivity approach includes one or more of dispersal parameters (e.g., pillar width, a decode threshold, an information dispersal algorithm), a slice selection approach per set of slices (e.g., how many slices relative to the decode threshold percent to select), a slice partitioning approach (e.g., dividing each slice into two or more portions), a slice to wireless system association (e.g., how many and which slices per set of slices to send via which wireless communication system). The determination may be based on one or more of wireless system information associated with a plurality of wireless systems (e.g., capabilities, capacity, availability, performance, cost) and transmission requirements (e.g., performance, security, reliability). For example, the processing module determines to send less than a decode threshold number of slices per set of slices via a first wireless communication system and to send remaining slices per set of slices via a second wireless communication system when an above-average level of security is required and sufficient capacity is available in the first communication system to send the less than a decode threshold number of slices.

The method continues at step 222 where the processing module encodes the data utilizing a dispersed storage error coding function to produce a plurality of sets of encoded data slices. The method continues at step 224 where the processing module selects a unique combination of less than a decode threshold number of encoded data slices per set of the plurality of sets of encoded data slices to produce a plurality of unique first subsets of encoded data slices in accordance with the wireless connectivity approach. For example, the processing module selects slices 1-9 of a first set, slices 1, 3-10 of a second set, slices 1-2, 4-10 of a third set, etc.

The method continues at step 226 where the processing module sends the plurality of unique first subsets of encoded data slices to the user device via corresponding sites of a public wireless communication system. The sending includes one or more of sending the plurality of unique first subsets of encoded data slices in accordance with the wireless connectivity approach, sending the plurality of unique first subsets of encoded data slices to a radio network controller (RNC) of the public wireless communication system, and sending the plurality of unique first subsets of encoded data slices to one or more transceivers associated with the public wireless communication system, wherein the one or more transceivers are affiliated with the user device (e.g., within wireless range, connected indicated by site registration information). For example, processing module sends slices 1-9 of the first set of slices to a first transceiver of the public wireless communication system, slices 1, 3-10 of the second set of slices to a second transceiver of the public wireless communication system, and slices 1-2, 4-10 of the third set of slices to a third transceiver of the public wireless communication system when a decode threshold is 10 and a pillar width is 16.

The method continues at step 228 where the processing module sends remaining encoded data slices (e.g., at least enough slices to provide a decode threshold number of slices in total, all remaining slices per set such that they pillar width number of slices are sent in total) corresponding to each unique first subset of encoded data slices to the user device via corresponding sites of a private wireless communication system. The corresponding site of the private wireless committee should system includes overlapping wireless coverage with a corresponding site of the public wireless immigration system. The sending includes one or more of sending the remaining encoded data slices in accordance with the wireless connectivity approach, sending the remaining encoded data slices to an RNC of the private wireless communication system, and sending the remaining encoded data slices to one or more transceivers associated with the private wireless communication system, wherein the one or more transceivers of the private wireless communication system are affiliated with the user device (e.g., within wireless range of the transceiver of the private wireless communication system, connected indicated by site registration information of the private wireless communication system). For example, processing module sends slices 10-16 of the first set of slices to a first transceiver of the private wireless communication system, slices 2, 11-16 of the second set of slices to a second transceiver of the private wireless communication system, and slices 3, 11-16 of the third set of slices to a third transceiver of the private wireless communication system when a decode threshold is 10, a pillar width is 16, and wireless coverage of transceivers 1-3 of the public wireless communication system is substantially the same as wireless coverage of transceivers 1-3 of the private wireless communication system. In addition, the processing module may send the wireless connectivity approach to the user device.

FIG. 10B is a flowchart illustrating another example of receiving data. The method begins with step 230 where a processing module (e.g., a dispersed storage (DS) processing of a user device) obtains a wireless connectivity approach (e.g., determine, receive). The method continues at step 232 where the processing module receives a plurality of unique first subsets of encoded data slices via a public wireless communication system in accordance with the wireless connectivity approach.

The method continues at step 234 where the processing module receives other encoded data slices corresponding to each unique first subset via one or more sites of a private wireless communication system in accordance with the wireless connectivity approach. The method continues at step 236 where the processing module combines encoded data slices from the plurality of unique first subsets of encoded data slices with encoded data slices from the other encoded data slices to produce at least a decode threshold number of encoded data slices per set of a plurality of sets of encoded data slices. For example, the processing module starts with a unique first subset of encoded data slices and adds enough slices from one or more streams of slices from the private wireless communication system to produce the decode threshold number of encoded data slices per set. The method continues at step 238 where the processing module decodes the at least the decode threshold number of encoded data slices per set of the plurality of sets of encoded data slices using a dispersed storage error coding function to reproduce data.

Figure 11A:
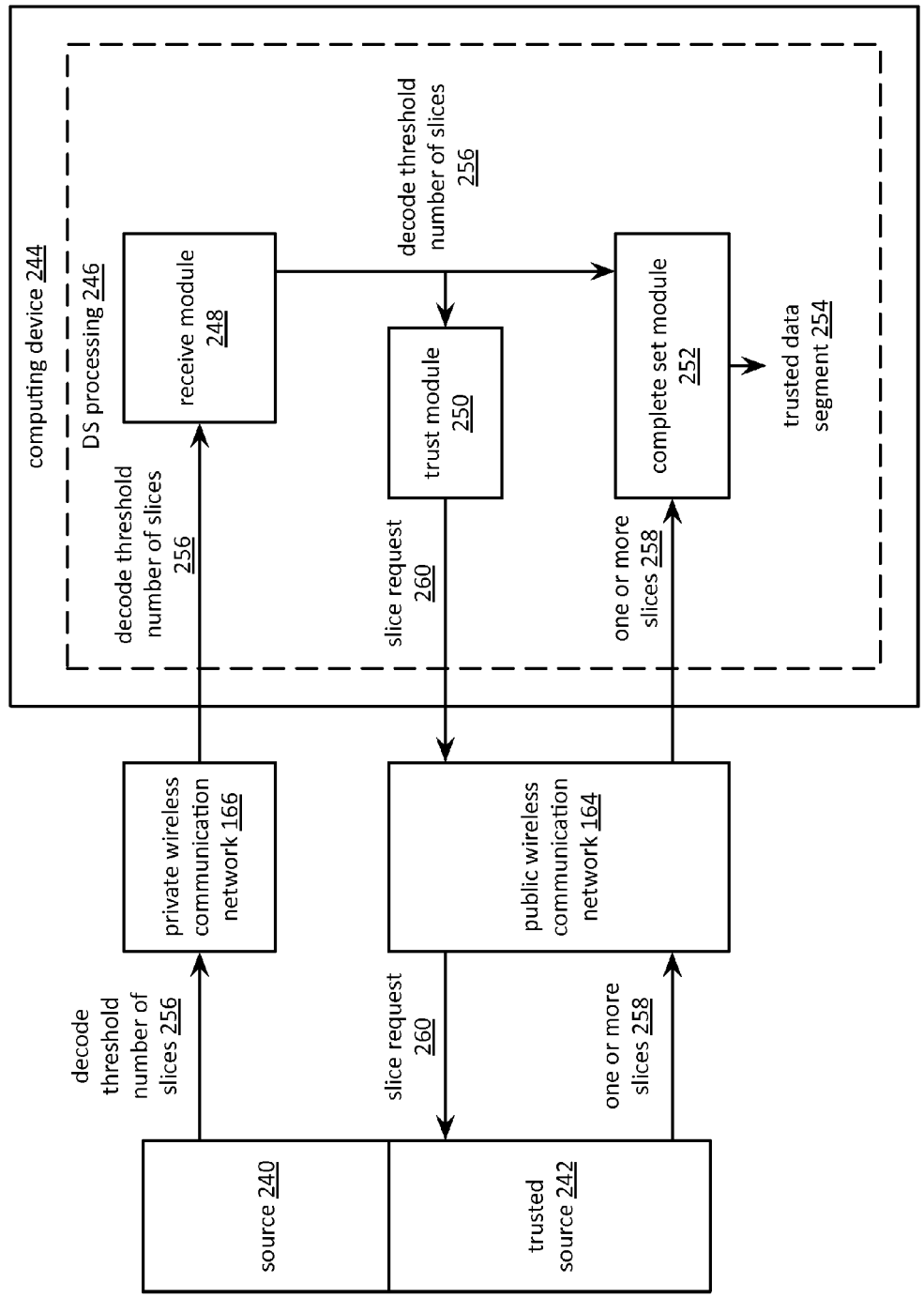
FIG. 11A is a schematic block diagram of another embodiment of a computing system in accordance with the present invention.

FIG. 11A is a schematic block diagram of another embodiment of a computing system that includes a source 240, a trusted source 242, a public wireless communication network 164, a private wireless communication network 166, and a computing device 244. The public wireless communication network 164 includes at least one of a public wireless local area network, a public cellular network, a public broadband network, a public satellite network, and a public internet. The private wireless communication network 166 includes at least one of a private wireless local area network, a private cellular network, a private two-way radio network, a private broadband network, a private satellite network, a private governmental wireless network, and a private intranet. Alternatively, the private wireless communication network 166 may be implemented with any communication network technology associated with higher security than the public wireless communication network 164. The source 240 includes at least one of a data server, an internet source, a media server, a user device, and a dispersed storage (DS) processing unit. The trusted source 242 includes at least one of a data server, an internet source, a media server, a user device, and a dispersed storage (DS) processing unit. Alternatively, the trusted source 242 includes the source 240. The computing device 244 may be implemented as at least one of a receiving entity, a user device, a DS processing unit, and a DS unit. The computing device 244 includes a DS processing 246. The DS processing includes a receive module 248, a trust module 250, and a complete set module 252.

The system functions to reproduce a trusted data segment 254. The receive module 248 receives a decode threshold number of encoded data slices 256. The receive module 248 may receive the decode threshold number of encoded data slices 256 via the private wireless communication network 166 from source 240. A data segment of data is encoded using a dispersed storage error coding function to produce a set of encoded data slices. The decode threshold number of encoded data slices 256 is a subset of the set of encoded data slices.

The trust module 250 determines whether to evoke a trust verification function after receiving the decode threshold number of encoded data slices 256. The trust module 250 determines whether to evoke the trust verification function by at least one of a variety of mechanisms. A first mechanism includes an automated process that is triggered upon receiving the decode threshold number of encoded data slices 256. For example, the automated process may indicate to evoke the trust function for every decode threshold number of encoded data slices. As another example, the automated process may indicate to evoke the trust function for every nth decode threshold number of encoded data slices. As yet another example, the automated process may indicate to evoke the trust function at every mth time interval.

A second mechanism includes determining that at least one of the decode threshold number of encoded data slices is of questionable trustworthiness. The trust module 250 determines that at least one of the decode threshold number of encoded data slices is of questionable trustworthiness by at least one of a variety of approaches. A first approach includes detecting an integrity verification failure of the at least one of the decode threshold number of encoded data slices (e.g., a received integrity value does not match a calculated integrity value). A second approach includes detecting a time delay in receiving the at least one of the decode threshold number of encoded data slices (e.g., compared to receiving other encoded data slices). A third approach includes decoding the decode threshold number of encoded data slices 256 yields an error in reproducing the data segment (e.g., a received data segment integrity value does not match a calculated data segment integrity value, the data segment is missing a watermark, etc.). A fourth approach includes detecting a communication path variance of the at least one of the decode threshold number of encoded data slices (e.g., an internet protocol routing path difference between the at least one slice and other slices). A fifth approach includes detecting a time stamp variance of the at least one of the decode threshold number of encoded data slices (e.g., a timestamp associated with the at least one slice is substantially different than timestamps associated with each of the other slices).

When the trust verification function is to be evoked, the trust module 250 selects one or more encoded data slices of the set of encoded data slices for trust verification to produce one or more selected encoded data slices 258. The trust module 250 selects the one or more encoded data slices 258 by at least one of a variety of methods. A first method includes an automated process that selects the one or more encoded data slices 258 after evoking the trust verification function. For example, the trust module 250 selects one or more encoded data slices of the decode threshold number of encoded data slices. As another example, the trust module 250 selects one or more encoded data slices of remaining encoded data slices of a set of encoded data slices. As yet another example, the trust module selects one or more encoded data slices of the set of encoded data slices (e.g., a combination). A second method includes selecting the one or more encoded data slices based on questionable trustworthiness of at least one of the decode threshold number of encoded data slices.

The complete set module 252 sends, to the trusted source 242, a request 260 to receive the one or more selected encoded data slices 258. The complete set module 252 sends the request 260 to the trusted source 242 via the public wireless communication network 164 or the private wireless communication network 166. For example, the complete set module 252 sends the request 260 to the trusted source 242 via the public wireless communication network 164 to provide improved system security by segregating reception of the decode threshold number of slices 256 via the private wireless communication network 166 and acquisition of the one or more selected encoded data slices 258 via the public wireless communication network 164. The complete set module 252 may receive, in response to the request 260, a message from the trusted source 242 indicating that the decode threshold number of encoded data slices 256 is not to be trusted (e.g., the source 240 is unauthorized). The complete set module 252 may modify the one or more selected encoded data slices 258 when receiving the message from the trusted source 242.

The complete set module 252 may receive the one or more selected encoded data slices 258 via the public wireless communication network 164. When the one or more selected encoded data slices 258 are received from the trusted source 242, the complete set module 252 determines that a trusted set of encoded data slices is available based on the decode threshold number of encoded data slices 256 and the received one or more selected encoded data slices 258. The complete set module 252 determines that the trusted set of encoded data slices is available by at least one of a variety of alternatives. A first alternative includes decoding different combinations of the decode threshold number of encoded data slices 256 and the received one or more selected encoded data slices 258, where each different decoding combination reproduces the data segment. A second alternative includes comparing a trusted data segment integrity value with a calculated data segment integrity value that is derived from decoding the decode threshold number of encoded data slices 256 and the received one or more selected encoded data slices 258. When the trusted set of encoded data slices is available, the complete set module 252 decodes the trusted set of encoded data slices to reproduce the trusted data segment 254.

Figure 11B:
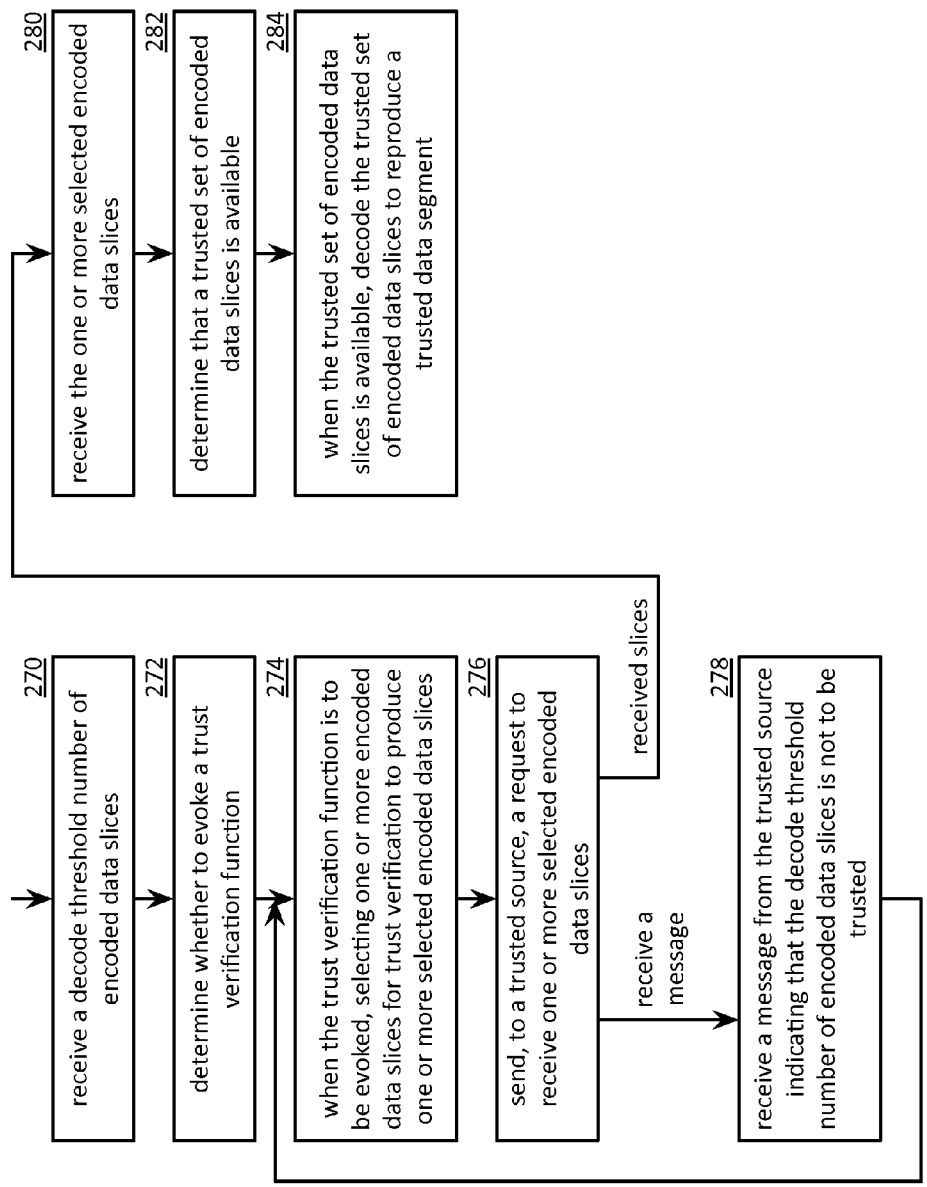
FIG. 11B is a flowchart illustrating an example of acquiring a trusted set of encoded data slices in accordance with the present invention.

FIG. 11B is a flowchart illustrating an example of acquiring a trusted set of encoded data slices. The method begins at step 270 where a processing module (e.g., of a receiving entity) receives a decode threshold number of encoded data slices. The processing module may facilitate receiving the decode threshold number of encoded data slices via a private wireless communication network. A data segment of data is encoded using a dispersed storage error coding function to produce a set of encoded data slices. The decode threshold number of encoded data slices is a subset of the set of encoded data slices;

The method continues at step 272 where the processing module determines whether to evoke a trust verification function after receiving the decode threshold number of encoded data slices. The determining whether to evoke the trust verification function includes at least one of a variety of mechanisms. A first mechanism includes an automated process that is triggered upon receiving the decode threshold number of encoded data slices. A second mechanism includes determining that at least one of the decode threshold number of encoded data slices is of questionable trustworthiness. The determining that at least one of the decode threshold number of encoded data slices is of questionable trustworthiness includes at least one of a variety of approaches. A first approach includes detecting an integrity verification failure of the at least one of the decode threshold number of encoded data slices. A second approach includes detecting a time delay in receiving the at least one of the decode threshold number of encoded data slices. A third approach includes decoding the decode threshold number of encoded data slices yields an error in reproducing the data segment. A fourth approach includes detecting a communication path variance of the at least one of the decode threshold number of encoded data slices. A fifth approach includes detecting a time stamp variance of the at least one of the decode threshold number of encoded data slices.

When the trust verification function is to be evoked, the method continues at step 274 where the processing module selects one or more encoded data slices of the set of encoded data slices for trust verification to produce one or more selected encoded data slices. The selecting one or more encoded data slices includes at least one of a variety of mechanisms. A first mechanism includes an automated process that selects the one or more encoded data slices after evoking the trust verification function. A second mechanism includes selecting the one or more encoded data slices based on questionable trustworthiness of at least one of the decode threshold number of encoded data slices.

The method continues at step 276 where the processing module sends, to a trusted source, a request to receive the one or more selected encoded data slices. The processing module may facilitate sending the request to the trusted source via a public wireless communication network or the private wireless communication network. In response to the request, the trusted source may output a message and/or slices. When the trusted source outputs the message, the method continues at step 278 where the processing module receives, in response to the request, a message from the trusted source indicating that the decode threshold number of encoded data slices is not to be trusted. The method loops back to step 274 when the processing module receives the message.

When the trusted source outputs the slices, the method continues at step 280 where the processing module receives the one or more selected encoded data slices via the public wireless communication network. When the one or more selected encoded data slices are received from the trusted source, the method continues at step 282 where the processing module determines that a trusted set of encoded data slices is available based on the decode threshold number of encoded data slices and the received one or more selected encoded data slices. The determining that the trusted set of encoded data slices is available includes at least one of a variety of methods. A first method includes decoding different combinations of the decode threshold number of encoded data slices and the received one or more selected encoded data slices, wherein each different decoding combination reproduces the data segment. A second method includes comparing a trusted data segment integrity value with a calculated data segment integrity value that is derived from decoding the decode threshold number of encoded data slices and the received one or more selected encoded data slices. When the trusted set of encoded data slices is available, the method continues at step 284 where the processing module decodes the trusted set of encoded data slices to reproduce a trusted data segment.

Figure 12B:
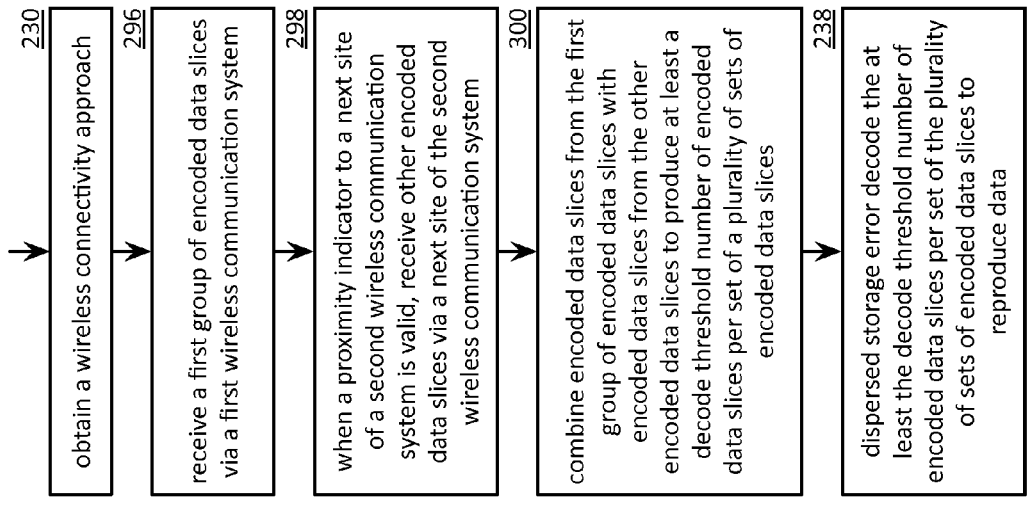
FIG. 12B is a flowchart illustrating another example of receiving data in accordance with the present invention.
Figure 12A:
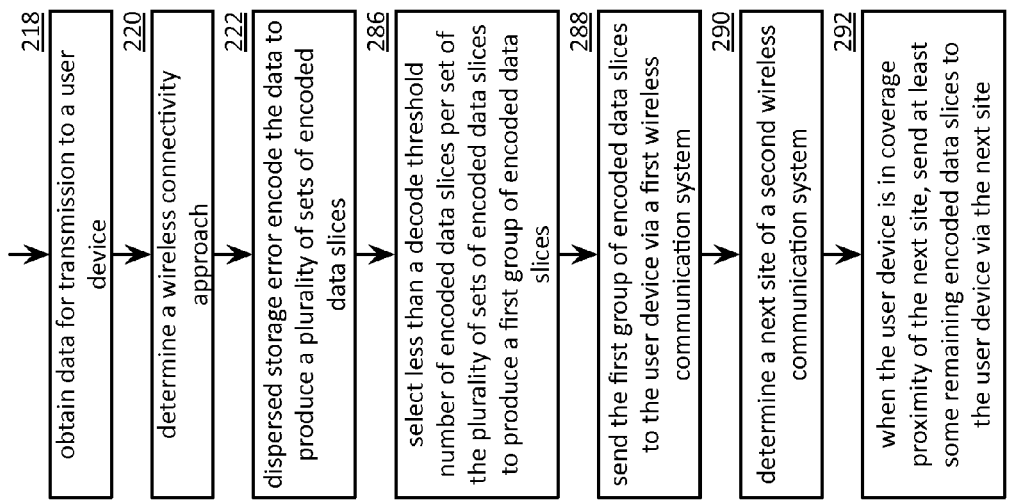
FIG. 12A is a flowchart illustrating another example of sending data in accordance with the present invention.

FIG. 12A is a flowchart illustrating another example of sending data, which include similar steps to FIG. 10A. The method begins with steps 218, 200, and 222 of FIG. 10A where a processing module (e.g., a dispersed storage (DS) processing of an infrastructure element) obtains data for transmission to a user device, determines a wireless connectivity approach, and dispersed storage error encodes the data to produce a plurality of sets of encoded data slices. The method continues at step 286 where the processing module selects less than a decode threshold number of encoded data slices per set of the plurality of sets of encoded data slices to produce a first group of encoded data slices. The method continues at step 288 where the processing module sends the first group of encoded data slices to the user device via a first wireless communication system.

The method continues at step 290 where the processing module determines a next site of a second wireless communication system. The next site includes an anticipated site of the second wireless indication system to provide wireless connectivity to the user device subsequent to a current site of the second wireless communication system. The determination may be based on one or more of a current location indicator of user device, route information, schedule adherence information, route history information, a site location list, wireless communication system registration information, a registration request, and a message. For example, the processing module determines the next site to be site 12 when the current site is site 9 and route information indicates that a direction of travel of the user device is from a geographic locality associated with site 9 to a geographic locality associated with site 12.

When the user device is detected to be in a coverage proximity of the next site, the method continues at step 292 where the processing module sends at least some remaining encoded data slices (e.g., at least enough slices to provide a decode threshold number of slices in total, all remaining slices per set such that they pillar width number of slices are sent in total) to the user device via the next site of the second wireless communication system. The processing module detects the user device to be in the coverage proximity of the next site based on one or more of an updated current location indicator of the user device, site registration information, and a message.

The sending includes one or more of sending the at least some of the remaining encoded data slices in accordance with the wireless connectivity approach, sending the at least some of the remaining encoded data slices to a radio network controller (RNC) of the second wireless communication system, and sending the at least some of the remaining encoded data slices to one or more transceivers associated with the second wireless communication system, wherein the one or more transceivers of the second wireless communication system are affiliated with the user device (e.g., within wireless range of the transceiver of the second wireless communication system, connected indicated by site registration information of the second wireless communication system). For example, the processing module sends all remaining slices of each set of the plurality of sets. As another example, the processing module sends all remaining slices of sets that were sent when the user device was in a coverage proximity to a previous site of the second wireless communication system. As yet another example, the processing module sends slices of predetermined segments. In addition, the processing module may send the wireless connectivity approach to the user device.

FIG. 12B is a flowchart illustrating another example of receiving data, which include similar steps to FIG. 10B. The method begins with step 230 of FIG. 10B where a processing module (e.g., a dispersed storage (DS) processing of a user device) obtains a wireless connectivity approach. The method continues at step 296 where the processing module receives a first group of encoded data slices via a first wireless communication system. When a proximity indicator to a next site of a second wireless communication system is valid, the method continues at step 298 where the processing module receives other encoded data slices via the next site of the second wireless communication system in accordance with the wireless connectivity approach. The processing module detects the proximity indicator to the next site of the second wireless communication system based on one or more of an updated current location indicator, site registration information, and a message. In addition, the processing module may output an indication with regards to one or more of the next site and route information that includes the next site (e.g., providing a user interface indication).

The method continues at step 300 where the processing module combines encoded data slices from the first group of encoded data slices with encoded data slices from the other encoded data slices to produce at least a decode threshold number of encoded data slices per set of a plurality of sets of encoded data slices. The method continues with step 238 of FIG. 10B where the processing module dispersed storage error decodes the at least the decode threshold number of encoded data slices per set of the plurality of sets of encoded data slices to reproduce data.

FIG. 13A is a flowchart illustrating another example of sending data, which include similar steps to FIG. 10A. The method begins with steps 218 and 222 of FIG. 10A where a processing module (e.g., a dispersed storage (DS) processing of an infrastructure element) obtains data for transmission to a user device and dispersed storage error encodes the data to produce a plurality of sets of encoded data slices. The method continues at step 308 where the processing module determines a slice partitioning approach. The slice partitioning approach includes one or more of dispersal parameters (e.g., pillar width, a decode threshold, an information dispersal algorithm), a slice selection approach per set of slices (e.g., how many slices relative to the decode threshold percent to select), a slice partitioning method (e.g., dividing each slice into two or more portions), a slice to wireless system association (e.g., how many and which slices per set of slices to send via which wireless communication system).

The slice partitioning method further includes one or more of how many slices per set to partition, how to divide each slice, and which wireless communication system to utilize send each portion to the user device. The determining may be based on one or more of wireless system information associated with a plurality of wireless systems (e.g., capabilities, capacity, availability, performance, cost) and transmission requirements (e.g., performance, security, reliability). For example, the processing module determines that the slice partitioning method includes partitioning a decode threshold number of slices per set into equal halves of slices when a security requirement indicates average securities required.

The method continues at step 310 where the processing module partitions at least one encoded in a slice per set of the plurality of sets of encoded data slices to produce a first slice partitioning and a second slice partitioning in accordance with the slice partitioning approach. For example, the processing module produces the first slice partitioning to include a group of first partitions of the one or more slices per set and produces the second slice partitioning to include remaining portions of the one or more slices per set (e.g., whole slices not partitioned).

The method continues at step 312 where the processing module sends the first slice partitioning to the user device via a first wireless communication system. The sending includes one or more of sending the first slice partitioning in accordance with the slice partitioning approach, sending the first slice partitioning to a radio network controller (RNC) of the first wireless communication system, and sending the first slice partitioning to one or more transceivers associated with the first wireless communication system, wherein the one or more transceivers are affiliated with the user device (e.g., within wireless range, connected indicated by site registration information).

The method continues at step 314 where the processing module sends the second slice partitioning to the user device via a second wireless communication system. The sending includes one or more of sending the second slice partitioning in accordance with the slice partitioning approach, sending the second slice partitioning to an RNC of the second wireless communication system, and sending the second slice partitioning to one or more transceivers associated with the second wireless communication system, wherein the one or more transceivers of the second wireless communication system are affiliated with the user device (e.g., within wireless range of the transceiver of the second wireless communication system, connected indicated by site registration information of the second wireless communication system). In addition, the processing module may send the wireless connectivity approach to the user device.

FIG. 13B is a flowchart illustrating another example of receiving data, which include similar steps to FIG. 10B. The method begins at step 316 where a processing module (e.g., a dispersed storage (DS) processing of a user device) obtains a slice partitioning approach. The obtaining includes at least one of outputting a query, receiving a response, a lookup, requesting the approach from a DS processing unit, receiving the approach from the DS processing unit, and receiving the approach from a radio network controller (RNC).

The method continues at step 318 where the processing module receives a first slice partitioning via a first wireless communication system in accordance with the slice partitioning approach. The method continues at step 320 where the processing module receives a second slice partitioning via a second wireless communication system in accordance with the slice partitioning approach. The method continues at step 322 where the processing module combines the first slice partitioning with the second slice partitioning to produce at least a decode threshold number of encoded data slices per set of a plurality of sets of encoded data slices. For example, the processing module starts with combining slice portions of the first slice partitioning with slice portions of the second slice partitioning to produce the at least the decode threshold number of encoded data slices per set. The method continues with step 238 of FIG. 10B where the processing module dispersed storage error decodes the at least the decode threshold number of encoded data slices per set of the plurality of sets of encoded data slices to reproduce data (e.g., in accordance with the slice partitioning approach).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device, the method comprises:
   in response to a data segment access request, generating a set of access requests regarding a set of encoded data slices, wherein a data segment of data is encoded using a dispersed storage error coding function to produce a set of encoded data slices and wherein a decode threshold number of encoded data slices corresponds to a minimum number of encoded data slices required to recover the data segment;
   sending a subset of the access requests to storage units of a dispersed storage network (DSN);
   sending an access request of the set of access requests to a trusted storage unit of the DSN;
   receiving a trusted encoded data slice from the trusted storage unit;
   receiving a subset of encoded data slices from the storage units;
   utilizing the trusted encoded data slice to authenticate the subset of encoded data slices; and
   when the subset of encoded data slices are authenticated, decoding the trusted encoded data slice and the subset of encoded data slices to recover the data segment.

2. The method of claim 1 further comprises:
   comparing an integrity value of the trusted encoded data slice with integrity values of encoded data slices of the subset of encoded data slices to authenticate the subset of encoded data slices.

3. The method of claim 1 further comprises:
   decoding the threshold number of encoded data slices using different combinations of the subset of encoded data slices with the trusted encoded data slice to produce potential recovered data segments;
   calculating integrity values for the potential recovered data segments; and
   when the integrity values for at least some of the potential recovered data segments substantially match, indicating that corresponding potential recovered data segments are authenticated.

4. The method of claim 1 further comprises:
   determining a trusted data segment integrity value based on the trusted encoded data slice; and
   comparing the trusted data segment integrity value with a calculated data segment integrity value that is derived from decoding the decode threshold number of encoded data slices and the received subset of encoded data slices to indicate that the received subset of encoded data slices are authenticated.

5. A computing device comprises:
   an interface;
   memory;
   a processing module operably coupled to the interface and the memory, wherein the processing module is operable to:
   in response to a data segment access request, generate a set of access requests regarding a set of encoded data slices, wherein a data segment of data is encoded using a dispersed storage error coding function to produce a set of encoded data slices and wherein a decode threshold number of encoded data slices corresponds to a minimum number of encoded data slices required to recover the data segment;

send a subset of access requests to storage units of a dispersed storage network (DSN);
send an access request of the set of access requests to a trusted storage unit of the DSN;
receiving a trusted encoded data slice from the trusted storage unit;
receiving a subset of encoded data slices from the storage units;
utilizing the trusted encoded data slice to authenticate the subset of encoded data slices; and
when the subset of encoded data slices are authenticated, decoding the trusted encoded data slice and the subset of encoded data slices to recover the data segment.

6. The computing device of claim 5, wherein the processing module is further operable to:
compare an integrity value of the trusted encoded data slice with integrity values of encoded data slices of the subset of encoded data slices to authenticate the subset of encoded data slices.

7. The computing device of claim 5, wherein the processing module is further operable to:
decode the threshold number of encoded data slices using different combinations of the subset of encoded data slices with the trusted encoded data slice to produce potential recovered data segments;
calculate integrity values for the potential recovered data segments; and
when the integrity values for at least some of the potential recovered data segments substantially match, indicate that corresponding potential recovered data segments are authenticated.

8. The computing device of claim 5, wherein the processing module is further operable to:
determine a trusted data segment integrity value based on the trusted encoded data slice; and
compare the trusted data segment integrity value with a calculated data segment integrity value that is derived from decoding the decode threshold number of encoded data slices and the received subset of encoded data slices to indicate that the received subset of encoded data slices are authenticated.

9. A computer readable storage device comprises;
a first memory section storing operational instructions that, when executed by a computing device, causes the computing device to:
in response to a data segment access request, generate a set of access requests regarding a set of encoded data slices, wherein a data segment of data is encoded using a dispersed storage error coding function to produce a set of encoded data slices and wherein a decode threshold number of encoded data slices corresponds to a minimum number of encoded data slices required to recover the data segment;
a second memory section storing operational instructions that, when executed by a computing device, causes the computing device to:
send a subset of the access requests to storage units of a dispersed storage network (DSN);
send an access request of the set of access requests to a trusted storage unit of the DSN;
a third memory section storing operational instructions that, when executed by a computing device, causes the computing device to:
receive a trusted encoded data slice from the trusted storage unit;
receive a subset of encoded data slices from the storage units;
a fourth memory section storing operational instructions that, when executed by a computing device, causes the computing device to:
utilize the trusted encoded data slice to authenticate the subset of encoded data slices; and
a fifth memory section storing operational instructions that, when executed by a computing device, causes the computing device to:
when the subset of encoded data slices are authenticated, decode the trusted encoded data slice and the subset of encoded data slices to recover the data segment.

10. The computer readable storage device of claim 9 further comprises:
comparing an integrity value of the trusted encoded data slice with integrity values of encoded data slices of the subset of encoded data slices to authenticate the subset of encoded data slices.

11. The computer readable storage device of claim 9 further comprises:
decoding the threshold number of encoded data slices using different combinations of the subset of encoded data slices with the trusted encoded data slice to produce potential recovered data segments;
calculating integrity values for the potential recovered data segments; and
when the integrity values for at least some of the potential recovered data segments substantially match, indicating that corresponding potential recovered data segments are authenticated.

12. The computer readable storage device of claim 9 further comprises:
determining a trusted data segment integrity value based on the trusted encoded data slice; and
comparing the trusted data segment integrity value with a calculated data segment integrity value that is derived from decoding the decode threshold number of encoded data slices and the received subset of encoded data slices to indicate that the received subset of encoded data slices are authenticated.

\* \* \* \* \*